United States Patent
Glaser et al.

(10) Patent No.: US 7,117,433 B1
(45) Date of Patent: Oct. 3, 2006

(54) HTML MAPPING SUBSTITUTION GRAPHICAL USER INTERFACE FOR DISPLAY OF ELEMENTS MAPPED TO HTML FILES

(75) Inventors: Howard Justin Glaser, San Jose, CA (US); Daniel Edward House, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 09/162,685

(22) Filed: Sep. 29, 1998

(51) Int. Cl.
*G06F 15/00* (2006.01)
*G06F 17/00* (2006.01)

(52) U.S. Cl. ............... 715/513; 715/515; 715/517; 715/523

(58) Field of Classification Search ......... 707/513, 707/505, 522, 515, 517, 523, 514, 10; 345/335, 345/347, 744; 715/513–523
See application file for complete search history.

(56) References Cited

U.S. PATENT DOCUMENTS

| | | | |
|---|---|---|---|
| 5,048,018 A | 9/1991 | Bernstein et al. | |
| 5,168,441 A | 12/1992 | Onarheim et al. | |
| 5,179,698 A | 1/1993 | Bachman et al. | |
| 5,193,182 A | 3/1993 | Bachman et al. | |
| 5,193,183 A | 3/1993 | Bachman | |
| 5,195,178 A | 3/1993 | Krieger et al. | |
| 5,241,645 A | 8/1993 | Coral et al. | |
| 5,249,300 A | 9/1993 | Bachman et al. | |
| 5,487,141 A | 1/1996 | Cain et al. | |
| 5,504,885 A | 4/1996 | Alashqur | |
| 5,548,749 A | 8/1996 | Kroenke et al. | |
| 5,553,218 A | 9/1996 | Li et al. | |
| 5,561,763 A | 10/1996 | Eto et al. | |
| 5,572,643 A | 11/1996 | Judson | |
| 5,623,656 A | 4/1997 | Lyons | |

(Continued)

FOREIGN PATENT DOCUMENTS

GB  2 315 891 A  2/1998

(Continued)

OTHER PUBLICATIONS

Ossenbruggen et al., Style sheet support for hypermedia documents, ACM conference Hypertext and Hypermedia, pp. 216-217, Apr. 1997.*

(Continued)

*Primary Examiner*—William Bashore
(74) *Attorney, Agent, or Firm*—Gates & Cooper LLP

(57) ABSTRACT

A method, apparatus, and article of manufacture, and memory for displaying a relationship between an HTML file and an element in the HTML file is disclosed. The method comprises the steps of reading information from a project file, the information comprising a relationship between the element and the HTML file, processing the information to map the element to the HTML file, and displaying the mapping. In one embodiment, the invention also comprises a program storage device, tangibly embodying instructions for performing the above method steps.

The invention also comprises an apparatus for displaying a relationship between an HTML file and an element such as a control in the HTML file. The apparatus includes a means for reading information from a project file, a processor coupled to the reading means for using the information to map the element to the HTML file, and a display coupled to the processor for displaying the mapping.

34 Claims, 27 Drawing Sheets

U.S. PATENT DOCUMENTS

| | | | |
|---|---|---|---|
| 5,701,451 A | | 12/1997 | Rogers et al. |
| 5,706,502 A | * | 1/1998 | Foley et al. ............... 707/10 |
| 5,716,453 A | | 2/1998 | Stewart |
| 5,717,924 A | | 2/1998 | Kawai |
| 5,765,147 A | | 6/1998 | Marcos et al. |
| 5,845,299 A | * | 12/1998 | Arora et al. ............. 707/513 |
| 5,911,145 A | * | 6/1999 | Arora et al. ............. 707/514 |
| 5,940,075 A | * | 8/1999 | Mutschler, III et al. .... 345/335 |
| 5,974,430 A | * | 10/1999 | Mutschler, III et al. .... 707/505 |
| 6,061,696 A | * | 5/2000 | Lee et al. ............... 707/513 |
| 6,069,630 A | * | 5/2000 | Lisle et al. ............. 345/357 |
| 6,144,962 A | * | 11/2000 | Weinberg et al. ......... 707/10 |
| 6,182,092 B1 | * | 1/2001 | Francis et al. ........... 707/513 |
| 6,199,082 B1 | * | 3/2001 | Ferrel et al. ............ 707/522 |
| 6,268,851 B1 | * | 7/2001 | Bricklin et al. .......... 345/744 |
| 6,279,015 B1 | * | 8/2001 | Fong et al. .............. 707/523 |

FOREIGN PATENT DOCUMENTS

WO        WO 97/15017        4/1997

OTHER PUBLICATIONS

HTMLed (software application), Apr. 26, 1997 by Internet Software Technologies, downloaded on Jun. 27, 2003, from <http://www.winsite.com>, screenshots pp. 1-9.*

Nano WebEditor (software applicaiion), Aug. 19, 1997 by Namo Interactive Inc., downloaded on Jun. 27, 2003 from <http://www.winsite.com>, screenshots pp. 1-8.*

Ernigh, Jacqueline, "Progress Intros Appelvity 3.0 For Java Apps.", Newsbytes, Oct. 22, 1997. (page 1 only).

Gonsalve, Antone "Roaster Moves To Windows, Unix", PC Week, n50, v14, Dec. 1, 1997, p.43(1).

Dyck, Timothe, "Net Kynamics 4.0 Sets A Higher Standard", PC Week, n3, v15, Jan. 12, 1998, p. 29(2). (page 1 only).

Linthicum, David S., "The Changing Face of Dynamic HTML", Computer Shopper, n1, v18, Jan 1998, p.664(6). (page 1 only).

Stanek, William Robert, "Energizing Your Web Pages", PC Magazine, n15, v16, Sep. (, 1997, p.247(5). (page 1 only).

Rahmel, Dan, "Comparing JavaScript AND VBScript", DBMS, n11 r9, Oct. 1996, p.26(5). (page 1 only).

* cited by examiner

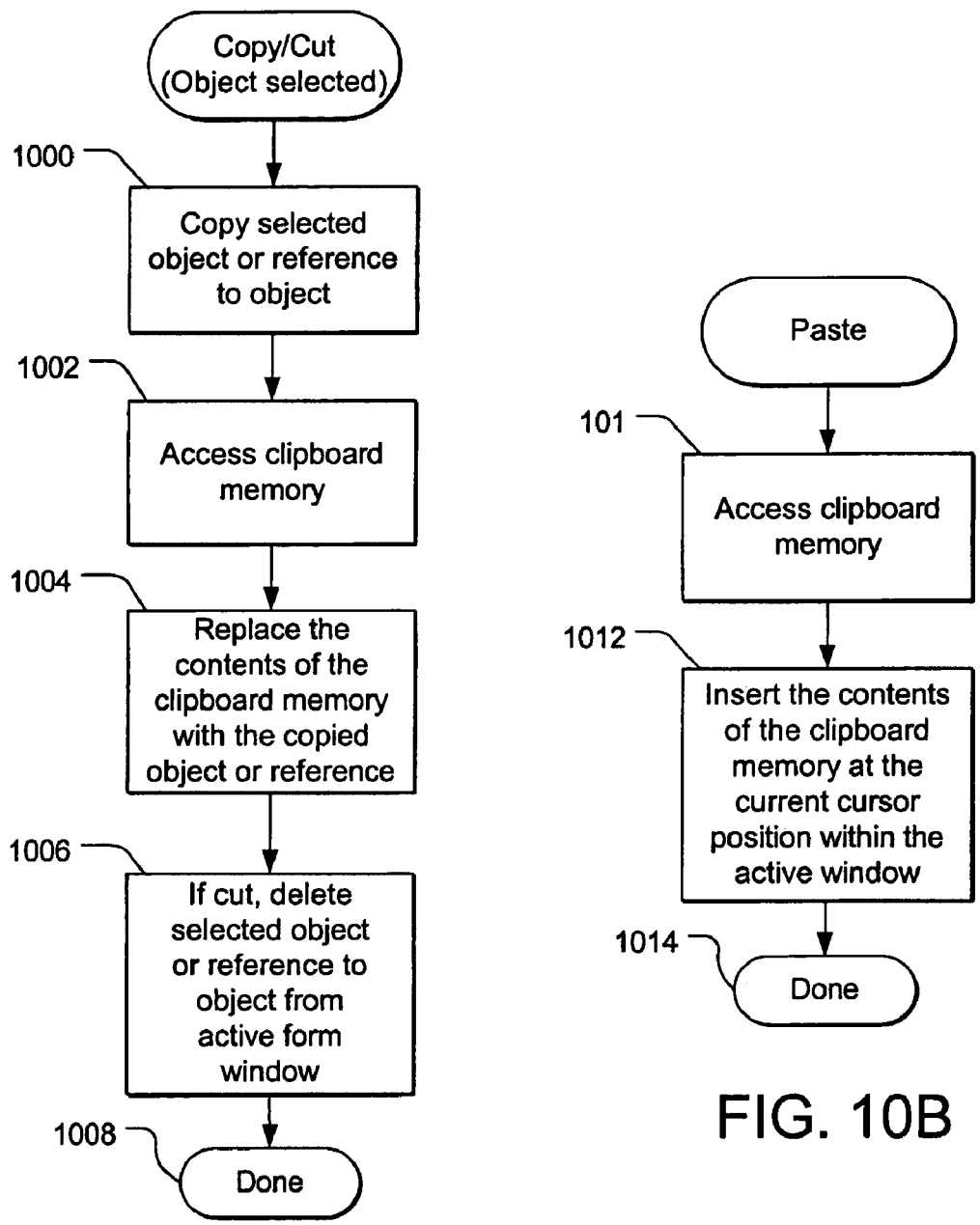

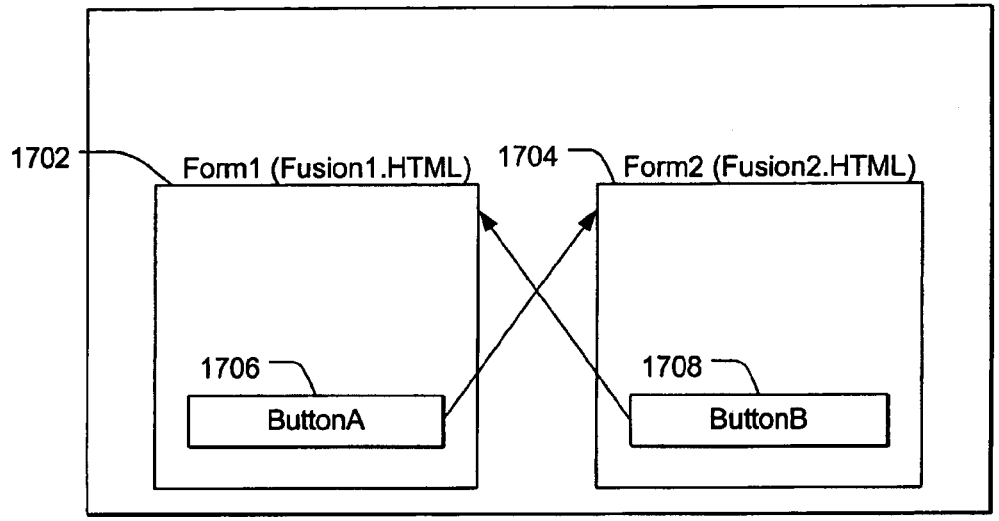

FIG. 17

```
In Fusion1.HTML
    ...
    <APPLET CODE=VABII_BUTTON.CLASS>
1802 <PARAM NAME=FORMSLIST VALUE="Form1,Form2">
    <PARAM NAME=Form1 VALUE="Fusion1.HTML">
    <PARAM NAME=Form2 VALUE="Fusion2.HTML">
1804 <PARAM NAME=ControlName VALUE="ButtonA">
    </APPLET>
1806 ....

In Fusion2.HTML
    ...
    <APPLET CODE=VABII_BUTTON.CLASS>
1808 <PARAM NAME=FORMSLIST VALUE="Form1,Form2">
    <PARAM NAME=Form1 VALUE="Fusion1.HTML">
    <PARAM NAME=Form2 VALUE="Fusion2.HTML">
1810 <PARAM NAME=ControlName VALUE="ButtonB">
    </APPLET>
1812 ....
```

FIG. 18

| Form Name | Maps to HTML File |
|---|---|
| Form1 | Fusion1.HTML |
| Form2 | Fusion2.HTML |

FIG. 19

HTML MAPPING SUBSTITUTION GRAPHICAL USER INTERFACE FOR DISPLAY OF ELEMENTS MAPPED TO HTML FILES

CROSS-REFERENCE TO RELATED APPLICATIONS

This application is related to the following co-pending and commonly assigned patent applications:

application Ser. No. 09/102,038, entitled "PROGRAMMATIC SWITCHING OF ARBITRARY HTML FORMS," filed Jun. 22, 1998, by Howard J. Glaser, Daniel E. House, Constance J. Nelin, Rebecca B. Nin, and Brian J. Owings;

application Ser. No. 09/102,323, entitled "REMOTE DEBUGGING OF INTERNET APPLICATIONS," filed Jun. 22, 1998, by Daniel E. House and Brian J. Owings;

application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on Mar. 31, 1997 by Daniel E. House, Brian J. Owings, and Shiau-Shiau Pei;

application Ser. No. 08/828,476, entitled "SHARED OBJECT MODEL," filed on Mar. 31, 1997, by Brian J. Owings, Shiau-Shiau Pei, and Daniel E. House;

application Ser. No. 08/828,989, entitled "METHOD AND APPARATUS FOR SIMULATING A MULTI-TIERED COMPUTER ENVIRONMENT," filed on Mar. 31, 1997, by Daniel E. House and Constance J. Nelin;

application Ser. No. 08/828,478, entitled "MULTI-TIER VIEW PROJECT WINDOW," filed on Mar. 31, 1997, by Howard J. Glaser, Daniel E. House, and Constance J. Nelin;

application Ser. No. 08/829,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot;

application Ser. No. 08/828,846, entitled "SHARED MODULES GRAPHICAL USER INTERFACE," filed on Mar. 31, 1997, by Howard J. Glaser, Daniel E. House, and Constance J. Nelin;

application Ser. No. 08/828,479, entitled "QUERY SELECTION FOR A PROGRAM DEVELOPMENT ENVIRONMENT," filed on Mar. 31, 1997, by Howard J. Glaser and Mary C. Lehner;

application Ser. No. 08/828,477, entitled "DOCKING AND FLOATING MENU/TOOL BAR," filed on Mar. 31, 1997, by Howard J. Glaser, Karl D. Johnson, and Stewart E. Nickolas;

application Ser. No. 08/828,890, entitled "HTML INTEGRATION UTILITY FOR A PROGRAM DEVELOPMENT ENVIRONMENT," filed on Mar. 31, 1997, by Howard J. Glaser;

application Ser. No. 08/828,897, entitled "EXTENDER SMART GUIDE," filed on Mar. 31, 1997, by Howard J. Glaser;

application Ser. No. 08/828,897, entitled "MULTI-TIER DEBUGGING," filed on Mar. 31, 1997, by Daniel E. House, Brian J. Owings, and Shiau-Shiau Pei;

application Ser. No. 08/828,990, entitled "DYNAMIC DISCOVERY OF CONTROLS," filed on Mar. 31, 1997, by Daniel E. House and Constance J. Nelin; and application Ser. No. 08/828,480, entitled "REMOTE SCRIPTING OF LOCAL OBJECTS," filed on Mar. 31, 1997, by Daniel E. House, Constance J. Nelin, and Rebecca B. Nin;

application Ser. No. 08/928,621, entitled "DYNAMICALLY DEBUGGING USER-DEFFNED FUNCTIONS AND STORED PROCEDURES," filed on Sep. 12, 1997, by Constance J. Nelin, Gerald H. Roth, Frederick T. Sharp, and Shu-Huar J. Yeh;

application Ser. No. 08/928,620, entitled "STORING P-CODE IN A DATABASE," filed on Sep. 12, 1997, by Curt L. Cotner, Wendy L. Koontz, Gerald H. Roth, Frederick T. Sharp and Shu-Huar J. Yeh; and application Ser. No. 08/928,358, entitled "COMPONENT-NEUTRAL BUILDER INTERFACE," filed on Sep. 12, 1997, by Daniel E. House and Brian J. Owings;

all of which applications are incorporated by reference herein.

BACKGROUND OF THE INVENTION

1. Field of the Invention

This invention relates in general to programming development environments performed by computers, and in particular, to a method and apparatus for displaying relationships between elements copied from forms to HTML pages.

2. Description of Related Art

With the fast growing popularity of the Internet and Intranets, especially Web-based networks, there is also a fast growing demand for access to server-hosted applications via the Internet. Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

The Internet has considerable potential to provide access to powerful and complex applications implemented at the Web server to a broad scope of remote clients. This implementation has important benefits such as reducing computer memory and processing requirements at the remote client, and increasing the security of the application by retaining selected portions of the application in a secure location in the Web server. Thus, there is a need in the art for methods of accessing software across an Internet or Intranet, and especially via Web-based networks. Further, given the quickly expanding scope of Internet-related applications and the shortage of qualified programmers, there is a need for a simplified environment for developing such software applications. Co-pending and commonly assigned application Ser. No. 08/828,890, entitled "HTML INTEGRATION UTILITY FOR A PROGRAM DEVELOPMENT ENVIRONMENT," filed on Mar. 31, 1997 by Howard J. Glaser discloses such an environment. It is further desirable for that development environment to be compatible with a wide variety of other authoring tools so that the best features of each tool can be fully utilized. Co-pending and commonly-assigned application Ser. No. 09/102,038, entitled "PROGRAMMATIC SWITCHING OF ARBITRARY HTML FORMS," filed Jun. 22, 1998 by Howard J. Glaser, Daniel E. House, Constance J. Nelin, Rebecca B. Nin, and Brian J. Owings discloses a system and method allowing switching of HTML pages generated with any arbitrary authoring tool.

Although the ability to modify HTML pages generated with an arbitrary authoring tool through a convenient development environment is invaluable, developers must be able to keep track of element mappings from the forms generated by the development tool to the HTML pages. To implement programmatic switching of arbitrary HTML, it is also important to provide the user with simple way to modify the mappings. Further, where the user is permitted to alter the mappings between elements and HTML pages, it is important that the user be alerted when the alerted mapping is invalid. The present invention satisfies these requirements by providing a HTML mapping and substitution graphical user interface (GUI).

SUMMARY OF THE INVENTION

To overcome the limitations in the prior art described above, and to overcome other limitations that will become apparent upon reading and understanding the present specification, the present invention discloses a method, apparatus, article of manufacture, and memory for displaying relationships between elements mapped from a form to an HTML page.

The method comprises the steps of reading information from a project file, processing the information to map the element to the HTML file, and displaying the mapping. In one embodiment, the information comprises a relationship between the element and the HTML file generated when the element is transferred from a form to an HTML page associated with the HTML file.

In one embodiment, the invention also comprises a program storage device, tangibly embodying instructions for performing the above method steps.

The invention also comprises an apparatus for presenting a relationship between an HTML file and an element in the HTML file. The apparatus comprises means for reading information from a project file describing a relationship between the element and the HTML file, a processor for processing the information to map the element to the HTML file, and a display for displaying the mapping generated by the processor.

The present invention also comprises a data structure for representing a software project in a single file, including data describing a relationship between elements and HTML files in the project.

BRIEF DESCRIPTION OF THE DRAWINGS

Referring now to the drawings in which like reference numbers represent corresponding parts throughout:

FIG. 17 is a diagram illustrating the use of the present invention with an arbitrary HTML authoring tool;

FIG. 18 is a diagram showing applet HTML tags as they appear after modification for arbitrary HTML;

FIG. 19 is a diagram showing a mapping from form names to corresponding HTML files in an arbitrary HTML authoring tool;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three-tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. In one embodiment, the applications constructed using the RAD tool are primarily oriented towards data access, data manipulation and data rendering, especially in conjunction with relational database management systems (RDBMS).

Hardware Environment

Figure 1:
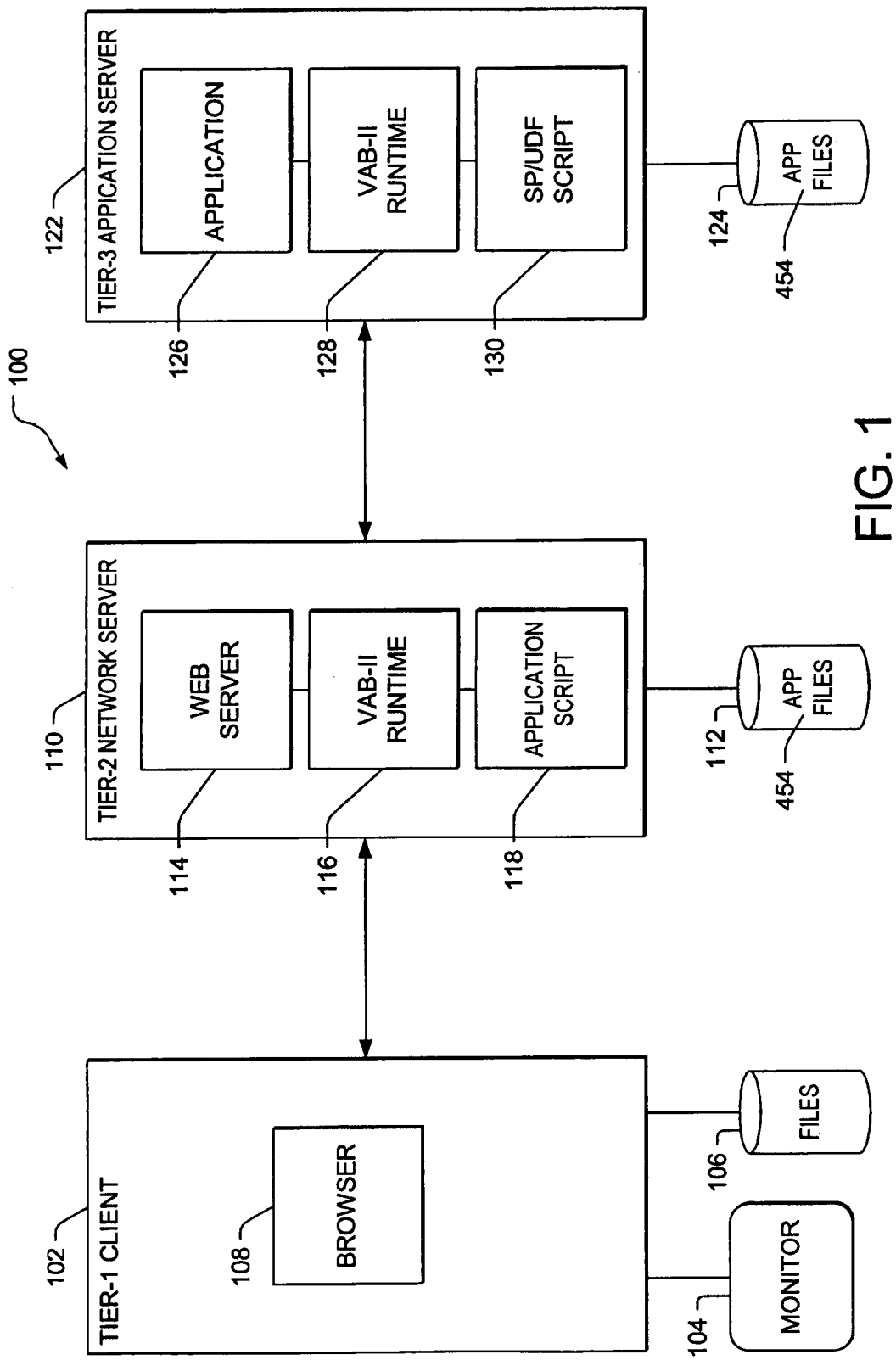
FIG. 1 is a block diagram that illustrates the three-tier architecture of the present invention.

FIG. 1 is a block diagram that illustrates the three-tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and, optionally, one or more data storage devices 106. In the preferred embodiment, the client computer 102 executes a browser 108 capable of containing and executing applets, such as MICROSOFT's INTERNET EXPLORER or NETSCAPE's NAVIGATOR. The browser 108 communicates with programs on other tiers through HTTP (Hypertext Transfer Protocol), sockets, or other communications mechanisms.

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, MICROSOFT, or HTTP daemons) communicates with the browser 108 and the third tier via HTTP, APIs, sockets, or other communications mechanisms. The VAB-II runtime module 116 executes the application scripts 118 and communicates with the third tier. The application scripts 118 (such as LOTUSSCRIPT scripts) can contain programming logic for communicating with both the browser 108 and the third tier. Preferably, the application scripts 118 include Basic programming instructions, JAVA, ACTIVEX, or DLL applet controls, embedded SQL, and other mechanisms known in the art.

The third tier comprises a application server 122 having one or more data storage devices 124 connected thereto. In the preferred embodiment, the application server executes a plurality of computer programs or applications 126, a persistent VAB-II runtime module 128, and Stored Procedure (SP) and User Defined Function (UDF) scripts 130 retrieved from an APP file 454 stored on a data storage device 124. The application 126 (such as IBM's DB2 product) receives requests either directly from tier-2 and/or indirectly from tier-2 via the VAB-II runtime module 128, and then performs the desired application functions. The VAB-II runtime module 128 executes the SP/UDF scripts 130. The SP/UDF scripts 130 comprise programming logic for accessing the application 126 and communicating with the tier-2 computer programs.

Figure 2:
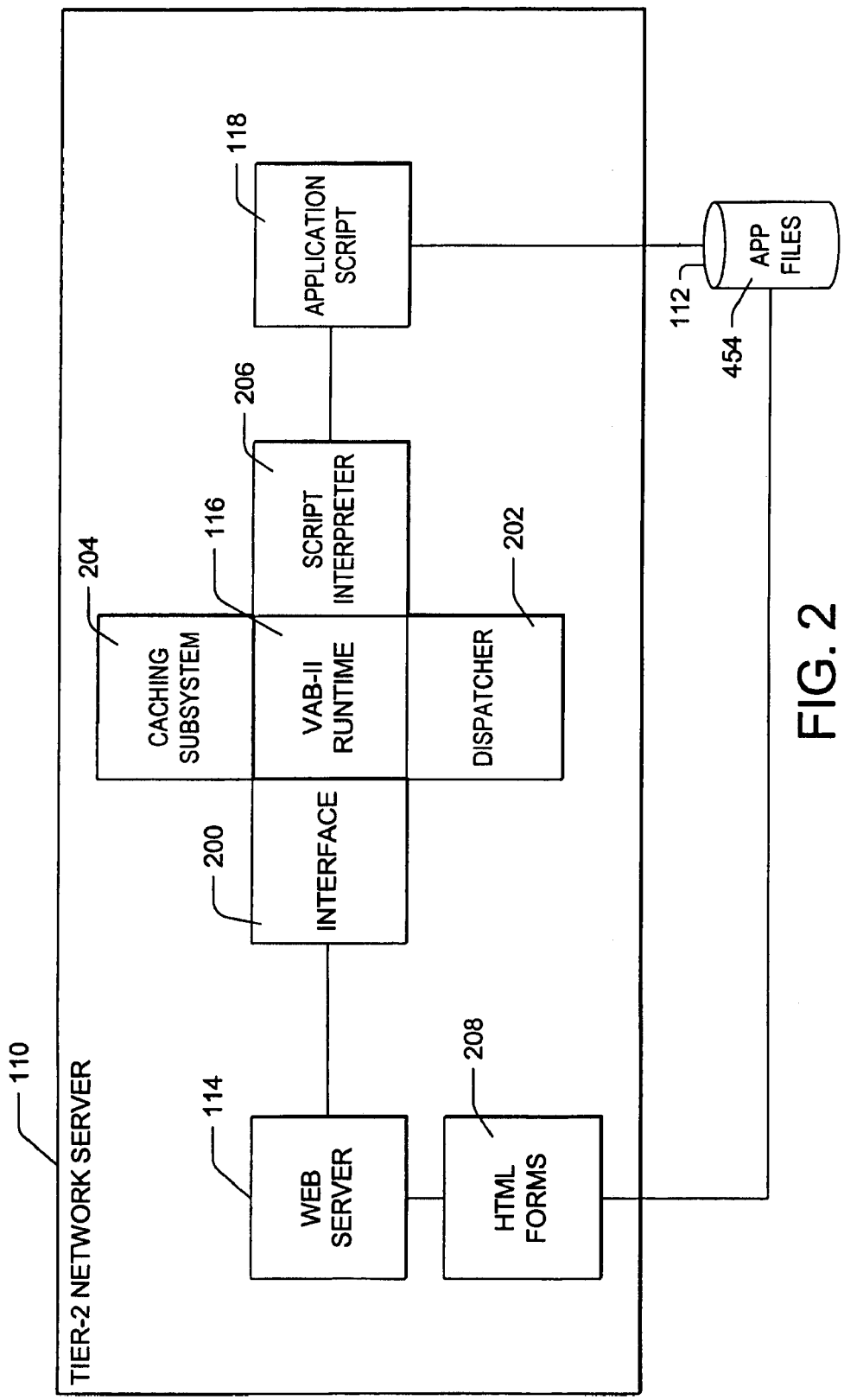
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 454 stored on a data storage device 112. The interface 200 takes input from the web server 114 via a Common Gateway Interface (CGI), NETSCAPE Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 454 stored on a data storage device 112.

Figure 3:
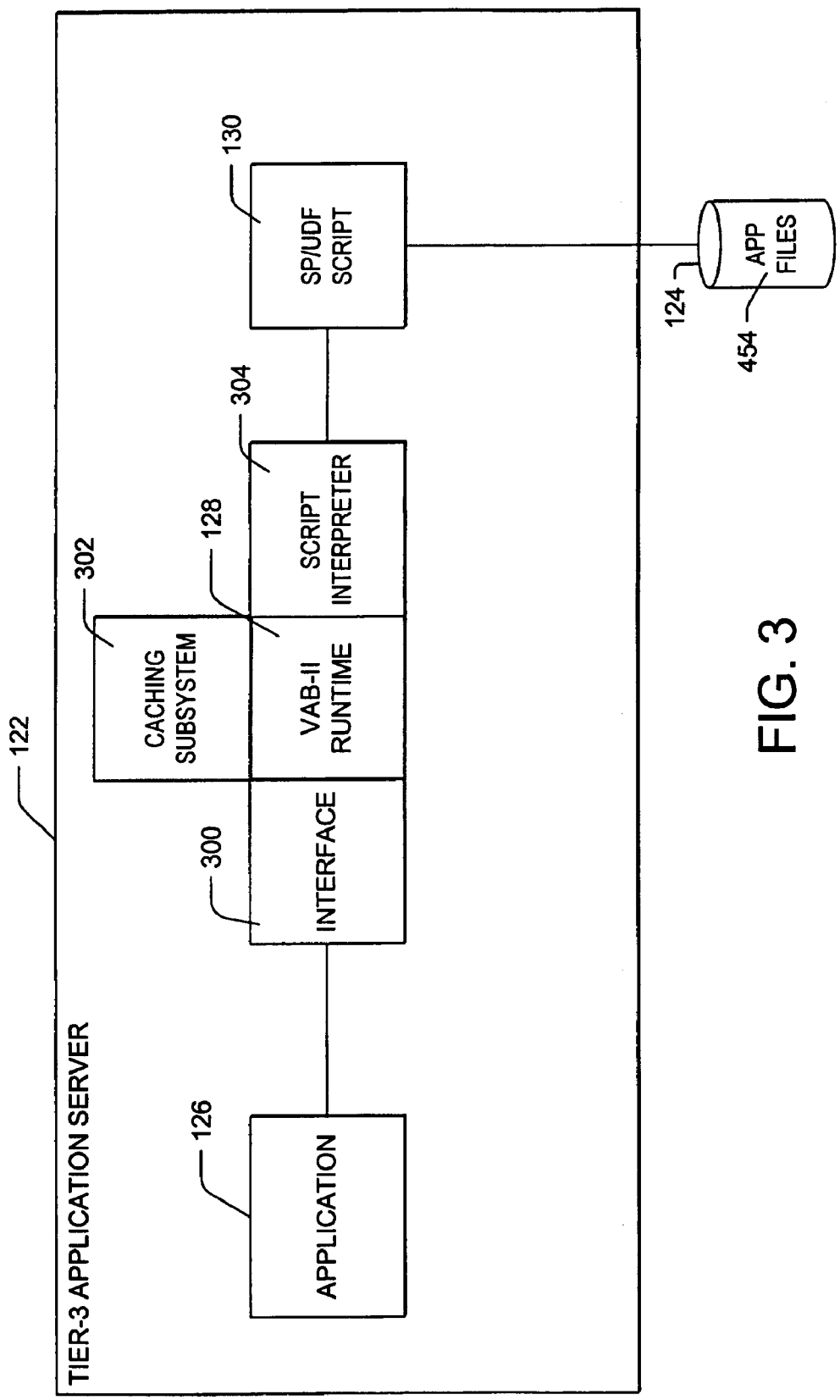
FIG. 3 is a block diagram that further illustrates the components of the application server in the present invention.

FIG. 3 is a block diagram that further illustrates the components of the application server 122 in the present invention. The VAB-II runtime module 128, for example, includes an interface 300 to the application 126, a caching subsystem 302, and a script interpreter 304 for executing one or more SP/UDF scripts 130 retrieved from one or more APP files 454 store on the data storage device 124. No dispatcher is required for the VAB-II runtime module 128 in the application server 122. The interface 300 provides a mechanism for invoking the VAB-II runtime module 128 from the application server 122 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 454.

As indicated above, the computer programs of the three tiers shown may be executed on separate computer hardware platforms or on a single computer hardware platform or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices. Programs of instructions for carrying out the operations performed at any of the three tiers can be tangibly embodied in one or more data storage devices 106, 112, 124.

Development Environment

Figure 4:
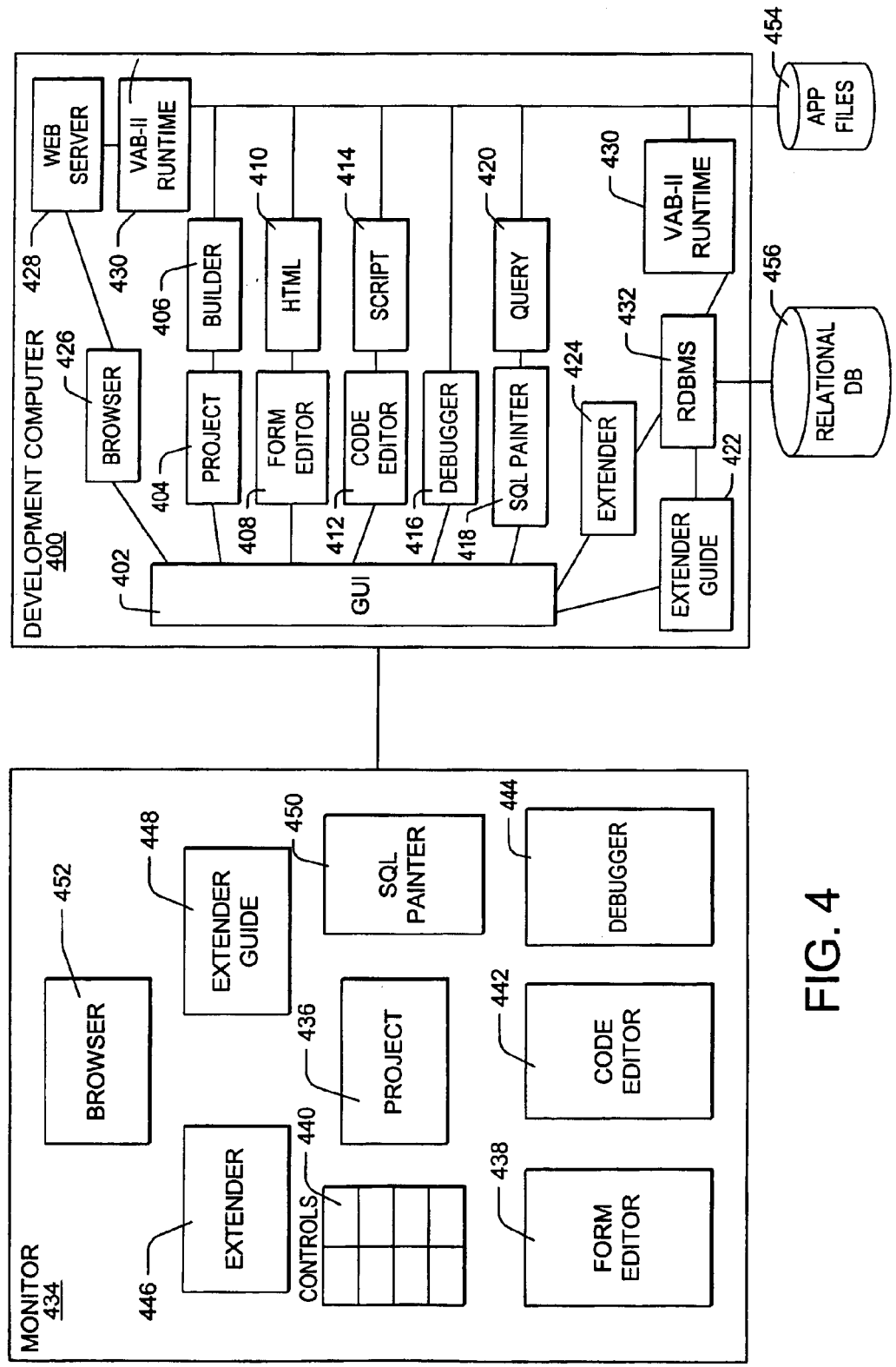
FIG. 4 is a block diagram that illustrates the development environment of the present invention.

FIG. 4 is a block diagram that illustrates the development environment of the present invention. For illustrative purposes, the application 126 in this embodiment is a relational database management system (RDBMS). A development computer 400 executes a Rapid Application Development (RAD) tool comprised of a number of different computer programs or modules, including a graphical user interface (GUI) 402, project manager 404 and associated builder 406, form editor 408 for constructing HTML forms 410, HTML mapping/substitution window 411, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, WINDOWS, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Controls

Figure 5A:
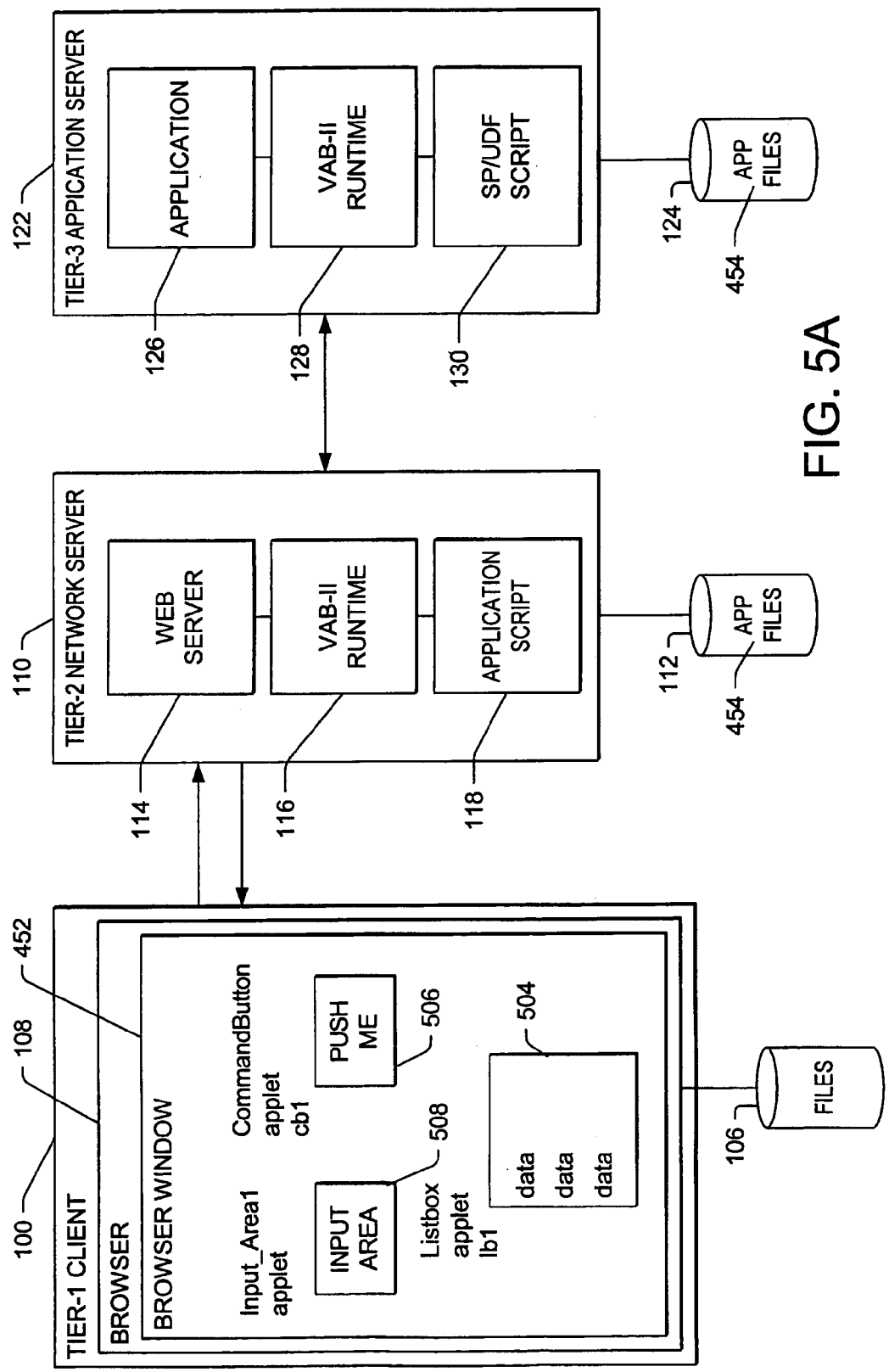
FIGS. 5A and 5B illustrate the use of controls and the remote scripting aspects of the present invention and the method steps used in connection with remote scripting.
Figure 5B:
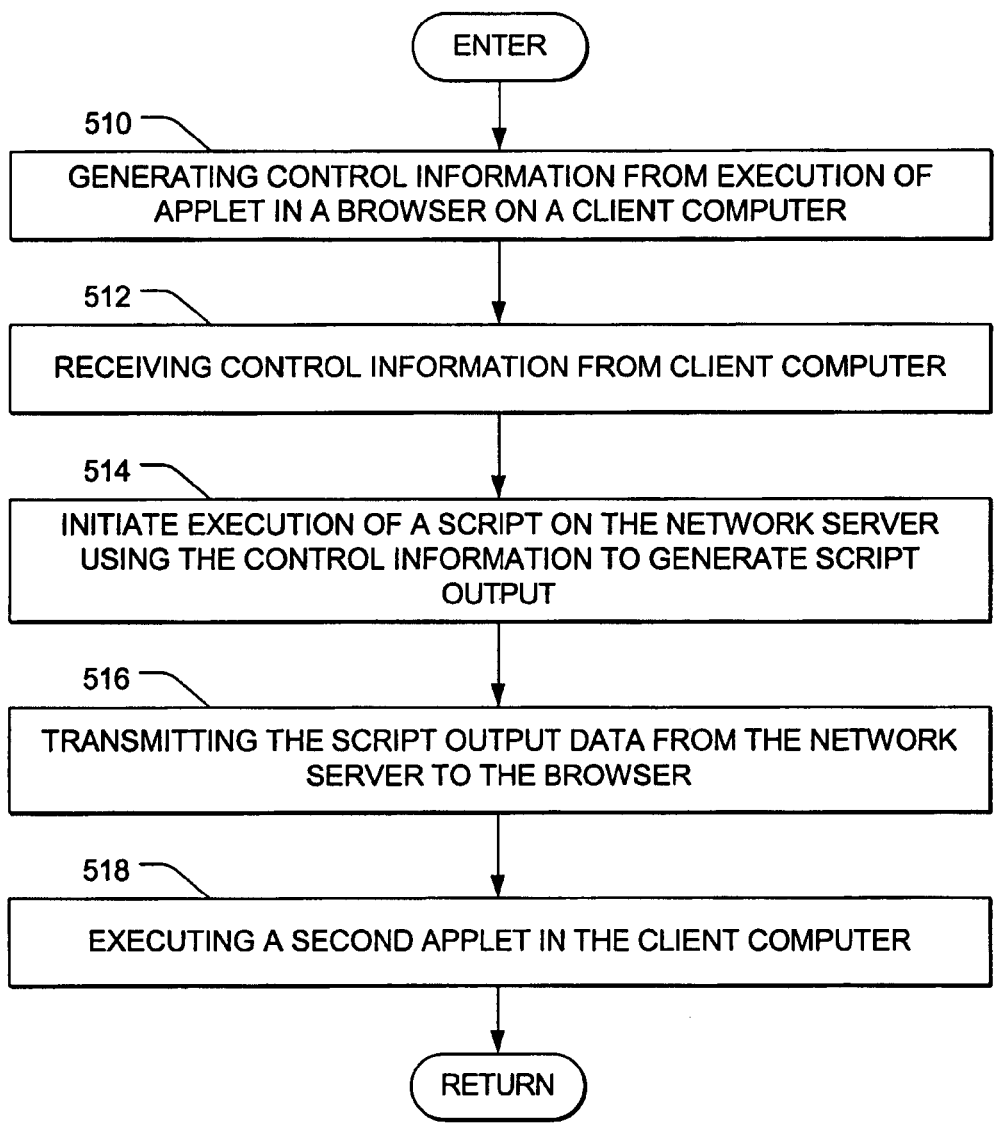

FIGS. 5A and 5B illustrate the use of the controls and the remote scripting aspects of the present invention. There are two types of controls: non-visual controls and visual controls. Further, there are two categories of visual controls: JAVA applet controls and static controls. Table 1 provides a partial list of JAVA applet controls; Table 2 provides a partial list of static controls; and Table 3 provides a partial list of non-visual controls.

TABLE 1

JAVA Applet Controls

| Control | Description |
| --- | --- |
| Label | This control displays a line of text. As an applet control, the text could be changed to show status, or the results of a request. The control does not respond to any events. |
| Button | This control is a push-button. One Button may have its default property set to true, in which case pressing the Enter key on other applets on the page causes the "button click" event to be triggered. |
| Listbox | Displays a list of selectable items. An event can be triggered when an item is selected. |

TABLE 2

Static controls

| Control | Description |
| --- | --- |
| Heading | This generates a <H1>, <H2>, or <H3> HTML tag depending on its properties. |
| Text | This generates a <P> HTML tag. |

TABLE 2-continued

Static controls

| Control | Description |
| --- | --- |
| List | This generates a <UL> or <OL> HTML tag depending on its properties. List items are typed directly in the list area. |
| Image | This generates a <IMG> HTML tag. |
| Hypertext Link | This generates a <A> HTML tag. |

TABLE 3

Non-visual controls

| Control | Description |
| --- | --- |
| Timer | To trigger a periodic event. |
| Data | To control data bound controls. |

"Non-visual controls" have no visual representation on the client 102. An example of non-visual controls is a "timer" used by the developer to cause time-based events. There may be a non-visual control that represents a form or an entire application. The purpose of these two examples would be to maintain properties and states of forms and applications.

"Visual controls" are those that have a visual representation on the client. The visual controls fall into two categories: JAVA applet controls and static controls. JAVA applet controls support invocation of scripts stored on the network server 110 and have properties that can be changed at runtime. Static controls are represented by HTML tags on the generated form, and no scripting or setting of properties at runtime is supported.

All visual controls that are scriptable are implemented as JAVA applets that communicate to the network server via HTTP. Non-visual controls may or may not be implemented as JAVA applets, depending on whether or not they need to be present and running in the browser 102 (if they do, they are applets; otherwise, they are not).

For example, a non-visual control representing a "timer" might be implemented as an applet, run in the browser 108, and communicate with the network server 110 when the timer "pops". In another example, the timer might be implemented as a script and run in the network server 110, in which case it is not an applet. In alternative embodiments, other containers (non-browsers) and other communication mechanisms (such as sockets) will be supported.

A JAVA applet is created for each scriptable control provided by the present invention. These applets may be customized by the developer. Since there is one applet per control, if there are five command buttons (for example) on one form, only one copy of the command button applet is downloaded to the client browser 108. This applet remains in the browser cache.

In the preferred embodiment, applet controls communicate back to the tier-2 VAB-II runtime module through the web server 114. This communication allows the present invention to remotely script local objects. Nominally, this is performed via HTTP, but in alternative embodiments, other mechanisms can be considered, such as socket level communication or other communication protocols.

A unique feature of the present invention is the capability to allow creation of local applets on the client which cause execution of scripting on remote machines with two-way communications between the local applet and the remote script. This technique has several advantages over prior art methods. For example, two-way communication and remote scripting allows the scripts to be stored and managed solely at the network server, resulting in greater code security and integrity. This feature also allows reduced data communications between the client and the network server, since operations may be intelligently shared between the two to minimize data transfer. Finally, since the client browser can cause execution of potentially lengthy scripts in the network server, this feature minimizes client processing and memory requirements.

This feature is further described with respect to FIG. 5A, which illustrates the flow of control information between applets in the client browser and the network server. In the present invention, when a user causes an event to be triggered on an applet, control information flows from the applet in the browser to the network server. FIG. 5A illustrates a form (FORM1), an applet called COMMAND_BUTTON1 506 on FORM1, and an applet called INPUT_AREA1 508 on FORM1, which are contained in an application APP1.

When FORM1 is displayed by the browser 108 and when a command button applet is "pressed", the associated JAVA applet invokes a universal resource locator (URL) to communicate with the running instance of the application on the network server 110.

The information that must flow from the JAVA applet to the network server 110 includes:

An identification of the application instance (or null). This can be either via authentication, where an authenticated user identifies uniquely the application instance, or a "hidden variable" containing an application instance identifier (this is insecure), or another means. If this is null, there is not yet an application instance created, which means that this is a "first call" and it will cause the application instance to be created.

The application name, e.g., APP1.

The name of the control causing the event, e.g., COMMAND_BUTTON1 506.

The event, e.g., ButtonClick.

The form on which the event occurred, e.g., FORM1.

Other state data, such as the current value of INPUT_AREA1 508 if it is changed. The developer may not have created an OnChanged event for INPUT_AREA1 508. In this case, when COMMAND_BUTTON1 506 is pressed, the current state of INPUT_AREA1 508 may not be accurate on the network server 110. Therefore, applets containing new state information are synchronized with the server whenever an event causes a flow from the client browser 108 to the network server 110 (this is why timer in the previous example is an applet in the client browser 108 and not just a network server object). This is analogous to HTML forms processing, where changed are "batched" before communicating with the network server for efficiency.

When the interface from the applet to the network server 110 is HTTP, a sample URL for the above might look like: "http://www.someco.com/cgi-bin/OurProduct? app=APP1+appinstance=ab12cdef+form=FORM1+control=COMMAND_BUTTON1+event=ButtonClick+other1=INPUT_AREA1 (user input from input_area1)+other2= . . . ".

The ButtonClick event is associated with a script on the network server 110. In this example, the script includes programming that accesses the application server through VAB-II Runtime 116 and returns data into a listbox 504 in FORM1. The data returned (script output data) from the application 122 and network servers 110 to the command button comprise a data string.

This data string might, for example, be "ADD DATA1 DATA2 DATA3 TO LB1." In this very simple example, this is a command string that the listbox 504 understands, and that the command button 506 now has in its possession. As illustrated, the data string comprises only a portion of an HTML page, relieving the need to transmit an entire HTML page merely to update a portion of a page. The data string may also comprise an entire HTML page. Alternatively, the data string may also comprise information used to execute a second applet in the client browser 108.

Getting the command string from the command button 506 to the listbox 504 is an example of applet-to-applet communication. It is facilitated by the fact that the command button 506 can retrieve a reference to LB1 504 from the list of name-reference pairs being kept in static data (command button 506 and listbox 504 are derived from the common base applet keeping this data). The command button 506 uses the reference to LB1 504 to invoke the listbox's "execute" method (which must be public), giving it the command string to update its contents.

FIG. 5B is a flow chart illustrating the method steps employed in implementing the foregoing. First, control information is generated by an applet in the browser 108. This is illustrated in block 510. That control information is transmitted from the client 102 to the network server 110 and received 512 therein. Next, using this control information, a script is executed on the network server 110. This is represented by block 514. Execution can be initiated either by the receipt of the control information, or by other means. Next, as shown in block 516, the resulting script output data is then transmitted from the network server to the browser 108, where if desired, the data can be displayed on the browser 108 or used to execute 518 an applet in the browser 108.

APP File

Figure 6A:
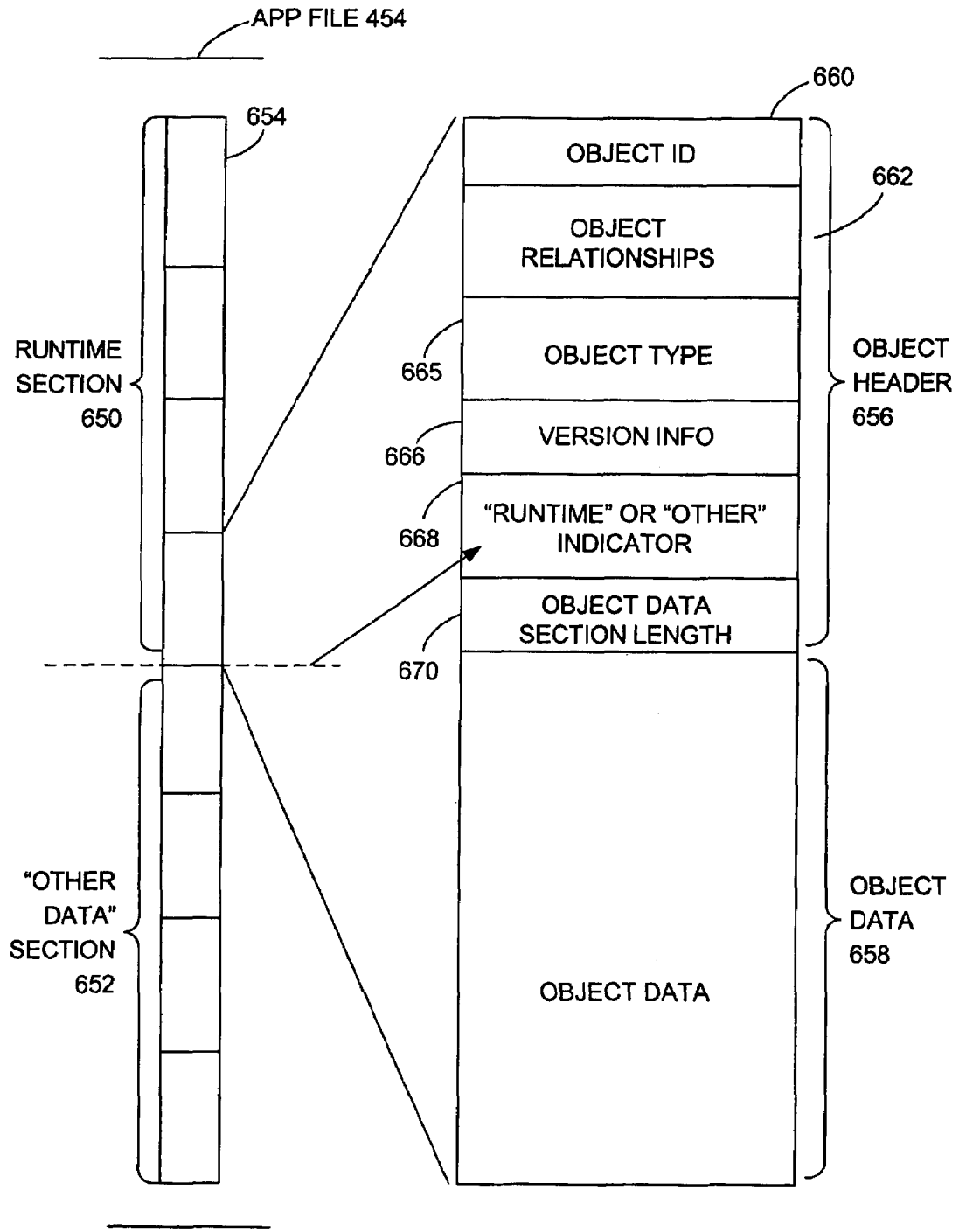
FIG. 6A is a diagram illustrating an APP file constructed by the development environment.

FIG. 6A is a block diagram that illustrates an APP file constructed by the development environment according to the present invention.

The APP file 454 contains all of the data and structures that represent a software project in the present invention including: project-related data such as information on the application for the tier-2 network server 110, stored procedures (SPs) or user-defined functions (UDFs) for the tier-3 database server 122, source code (optionally), event logic controls, forms, and relationships among all of these things.

The APP file 454 encapsulates all of the objects that make up a project. From a single APP file 454, the project and all of its state can be recovered (state also includes such design time behavior as which form is currently active and where in a module the code editor was last positioned before the project was saved). The APP file 454 also enables the present invention to utilize a common mechanism for restoring a project across development machines, across executables, and across releases.

The APP file 454 describes the persistence mechanism for the Object Model that all components of the present invention are built upon. Although not humanly readable, the data structure of the APP file 454 is described as follows.

The APP file 454 comprises two major sections, a Runtime Section 650 and an other data section 652. The Runtime Section 650 contains all of the data needed primarily at "runtime," including executable programming logic. Data stored in the Runtime Section 650 is used to quickly and efficiently load information that is used to run an application.

The second major section is the other data section 652, which contains all other project related data, including project environment data (such as source code, design time properties, other project development data, etc.). By segmenting the APP file 454 into these two sections, the speed of execution is enhanced, because reading in the other data section 652 can be skipped when executing an application.

Each of the major sections is further segmented into a series of minor sections 554 (a variable number of them), with each minor section containing information about one object in the VAB-II Object Model. For example, one minor section 654 may represent the OMProject object, another minor section could represent a particular Form object within it, etc.

Since the object model used in the present invention is a tree structure, the APP file 454 must represent this information. A node in a tree can have "n" children and "m" siblings (internally, a sibling relationship may be represented as a singly linked list, in which case a node would appear to have at most one sibling).

When in memory, relationships such as child or sibling can be represented simply by a memory pointer to an object. However, when encapsulated inside a APP file 454, pointers to memory have no meaning. The present invention solves this problem by instead representing information describing relationships between objects inside the APP file 454 using Object IDs 660 and Object Relationships 662.

Each object in the object model has an object ID 660. Instead of using memory pointers, the APP file 454 uses these object IDs 660 to store relationships between the objects. That is, instead of saving memory pointers in the APP file 454, the relationship is stored. For example, although not stored or interpreted in the English form below, the relationship may comprise the following: "ObjectID-5 has-child ObjectID-19."

For every object in the runtime section 650 or the other data section 652, there is an object header 656 and object data 658. The object header 656 comprises the following types of information: objectID 660, relationships 662, such as Has-Child(objectID) and Has-Sibling(objectID), object type 664 (e.g., Form), version information 665, runtime or other indicator 668 used to determine where the runtime section stops and the other data section begins, and length of the object data section 670.

The object data section 658 contains a stream of information that has meaning only to the particular object type. For example, an object type of form will have in its object data section 658 properties of the form object (such as size, color, etc.). For speed and efficiency, these data are in "stream" format. That is, it is written in an order that is determined by the object and read back in the exact same order (as opposed to writing name-value pairs that could be read and written in any order, but at the expense of extra space and time to parse the information when reading).

As an example of streaming, suppose that an object has property Color=Red and Size=15. The object data section would have "red 15" in it. It is up to the Object Type object to know that it wrote the order "color" then "size" and must read it back in the same way. An alternative would have been to write "Color=Red, Size=15" into the object data. This alternative would: (1) take up more space, and (2) require that the data be parsed when read it (that is, when reading a APP file and reconstructing the object, the data could be read in the reverse order (size then color), because a name-value pair was saved). While more flexible, there is a high performance penalty to be paid for this when large numbers of properties are involved.

From the foregoing, it can be seen that the data structure and use of the APP file 454 has numerous advantages. First, the APP file 454 uses a hybrid format in that it is partly name-value based (the object header section) and partly stream based (the object data section). This allows for flexibility, very high speed, and low space or storage capacity requirements. In addition, because the data structure of the APP file 454 segments the information into a runtime section 650 and an other data section 652, it allows for even higher speed when the APP file 454 is being read for the purpose of executing an application (as opposed to reading an APP file 454 to continue developing the application).

Another advantage of the data structure of the APP file 454 is that the APP file 454 contains all data required for a project. Other development tools typically keep many files that represent a project, resulting in the disadvantages discussed herein. Still another advantage of the APP file 454 is that it contains a persistent representation of the object model, which allows for a common code base among many parts of the present invention (such as builder, runtime, control pad, and others).

Figure 6B:
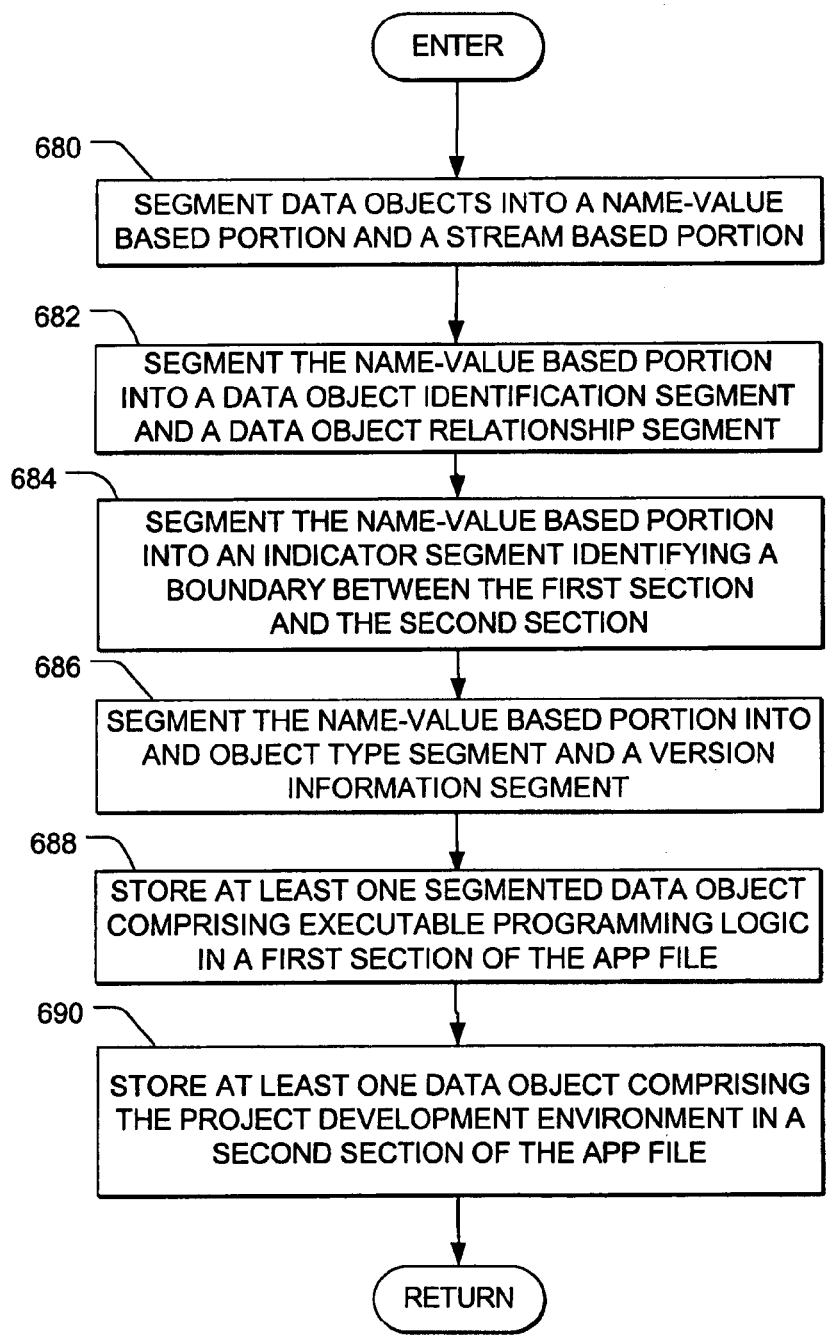
FIG. 6B is a flow chart illustrating the steps used in storing data in the APP file.

FIG. 6B is a flow chart illustrating the method steps used in storing data in the APP file 454 in accordance with the present invention. First, as shown in block 680, the data objects are segmented into name-value based portions and stream-based portions (for example, the object header 656 and the object data 658, respectively). Then, the name-value based portion is segmented into a data object identification segment, and a data object relationship segment. This is illustrated in block 682. Block 684 illustrates the method step of segmenting the name-value based portion into an indicator segment identifying a boundary between the runtime section 650 and the other data section 652 of the APP file 454. As shown in block 686, the method further includes the optional step of segmenting the object header into segments indicating the object type and version information. Finally, the data objects comprising executable programming logic is stored in the first, or runtime section 650 of the APP file 454, while the remaining data, including data describing the project development environment or state is stored in the other data section 652. This is shown in blocks 688 and 690, respectively.

HTML Integration Utility

The present invention discloses an HTML integration utility that allows visual selection and/or manipulation of HTML pages or forms. A user may drag and drop a selected control (e.g., a button) from one form or HTML page and onto another HTML page. On the development computer 400, this results in the applet code associated with the selected control being inserted into the code displayed in the code editor window or form editor window. The development computer 400 also performs a dependency check for other codes and/or controls upon which the inserted applet depends and issues warnings or performs automatic inclusion of the dependency code and/or control.

Figures 7, 8A:
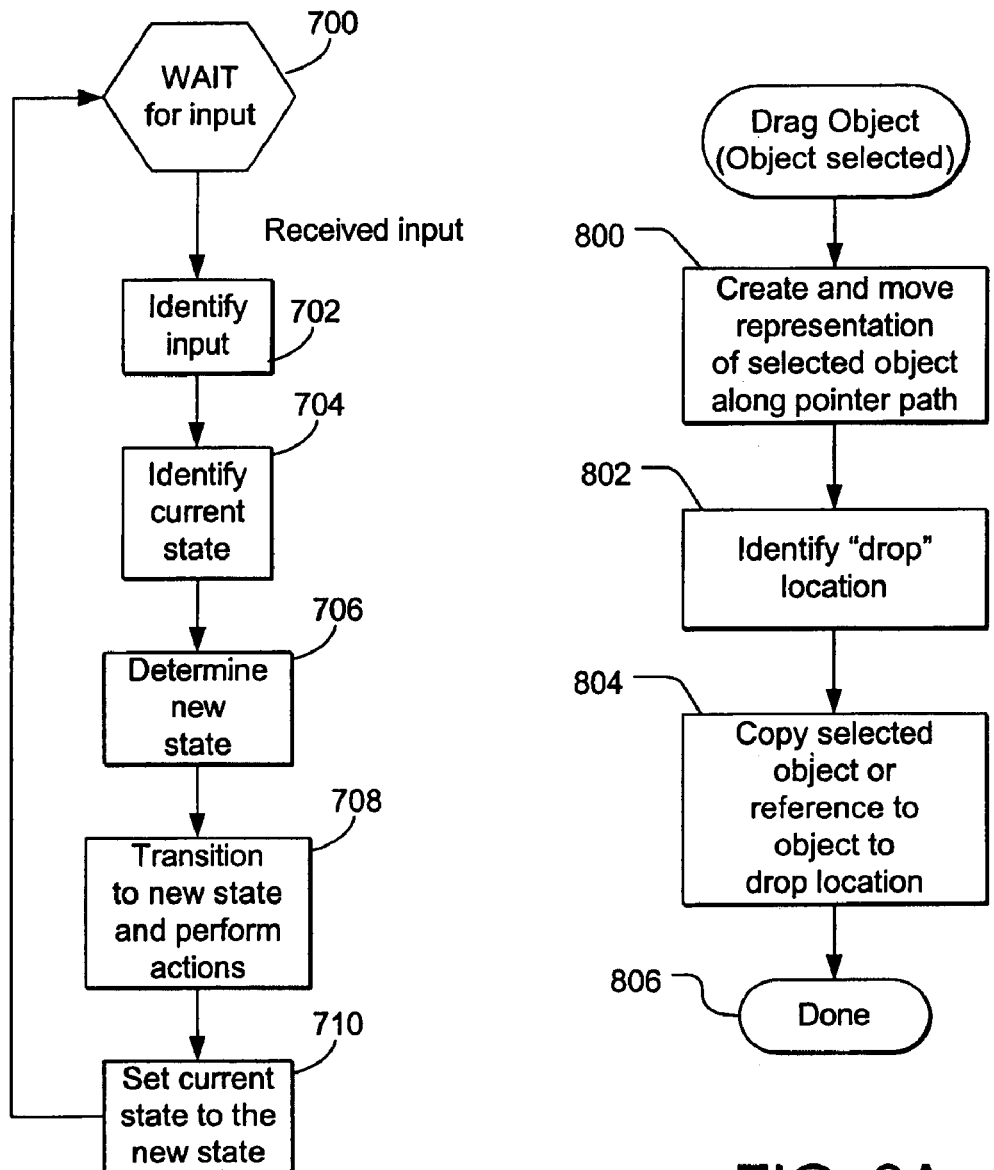
FIG. 7 is a flow chart illustrating the steps employed in handling the development environment of the computer.
FIG. 8A is a flow chart illustrating "drag and drop" operations.

FIG. 7 is a flow chart that illustrates the general logic of the development computer 400 in performing the steps necessary for handling the user interface for the development computer 400. In the development computer, operations are performed when transitions are made, based upon input events, from present or current states to new states.

Block 700 represents the development computer 400 waiting for an input event (e.g., a mouse button click). It should be appreciated that during this time, other system tasks, e.g., file, memory, and video tasks, etc., may also be carried out. When an input event occurs, control passes to block 702 to identify the input event. Based upon the input event, as well as the current state of the development computer 400 determined in block 704, a new state is determined in block 706. In block 708, a transition is made to the new state and performs any actions required for the transition. In block 710, the current state is set to the previously determined new state, and control returns to block 700 to wait for more input events.

The specific operations that are performed by block 708 when transitioning between states will vary depending upon the current state and the input event. The various operations required to implement the present invention represent particular events handled by the development computer 400. However, it should be appreciated that these events represent merely a subset of all of the events handled by the development computer 400.

Flowcharts which illustrate various operations that may be performed by the development computer as part of the present invention are shown in FIGS. 8A, 9A, 9B, 10A, and 10B. In each of these flowcharts, the header blocks thereof indicate the particular input event with the current state denoted in parentheses. In addition, corresponding diagrams, i.e., FIGS. 8B, 8C, 8D, 9C, 10C, and 10D, are provided to illustrate the operation of their respective flowcharts.

Drag and Drop

Figure 8B:
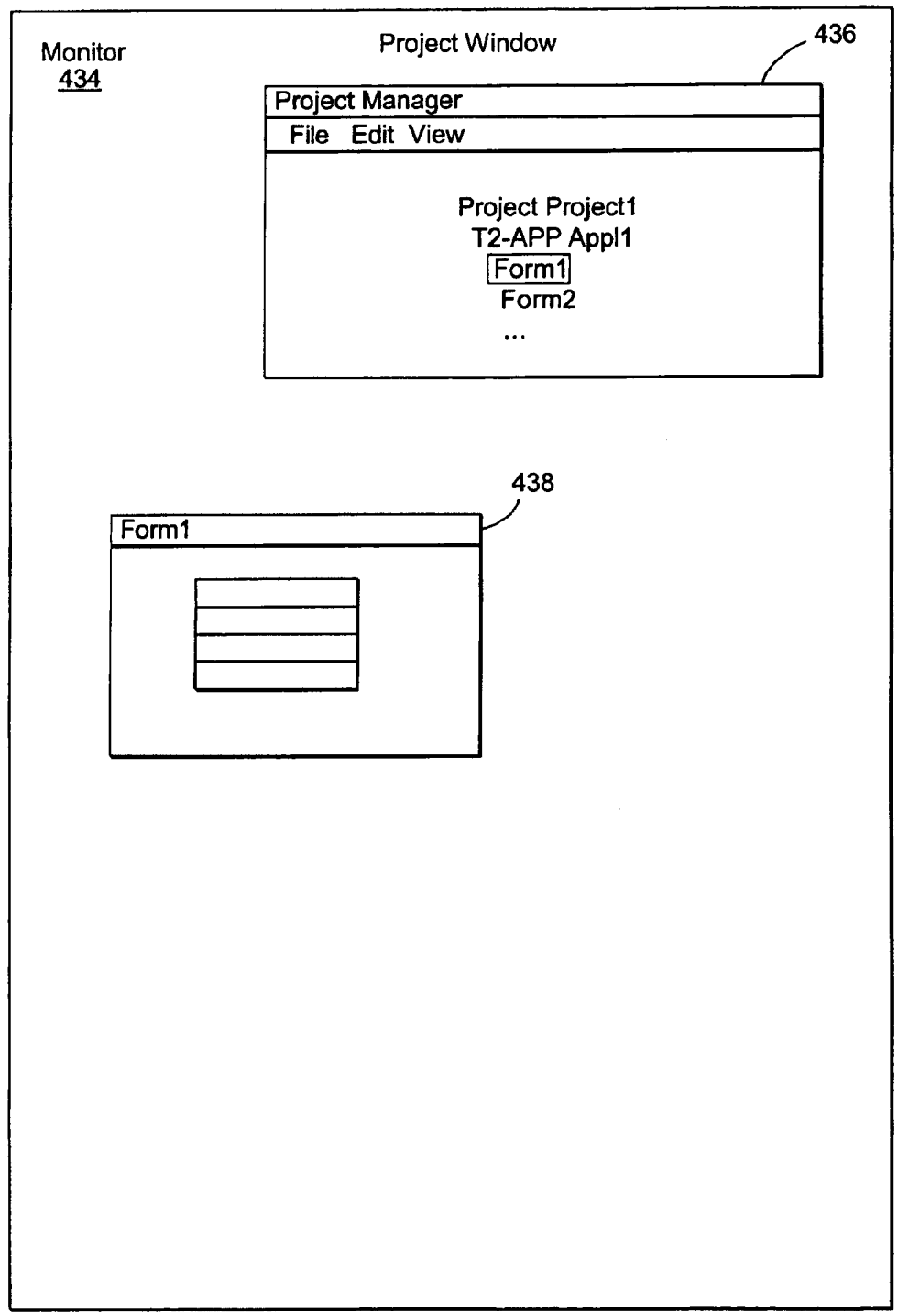
FIG. 8B is a flow chart illustrating the form editor and form window.
Figure 8C:
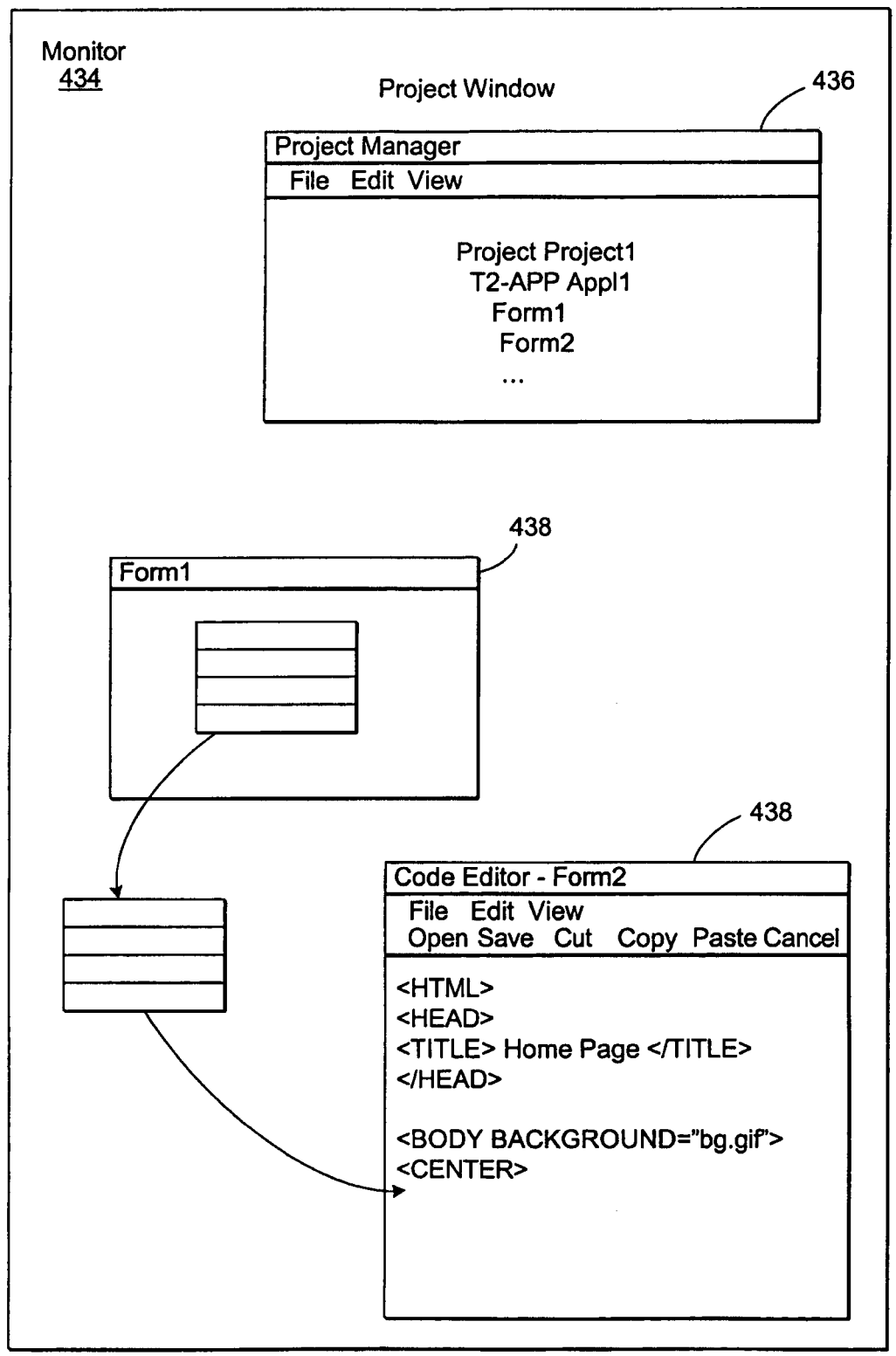
Figure 8D:
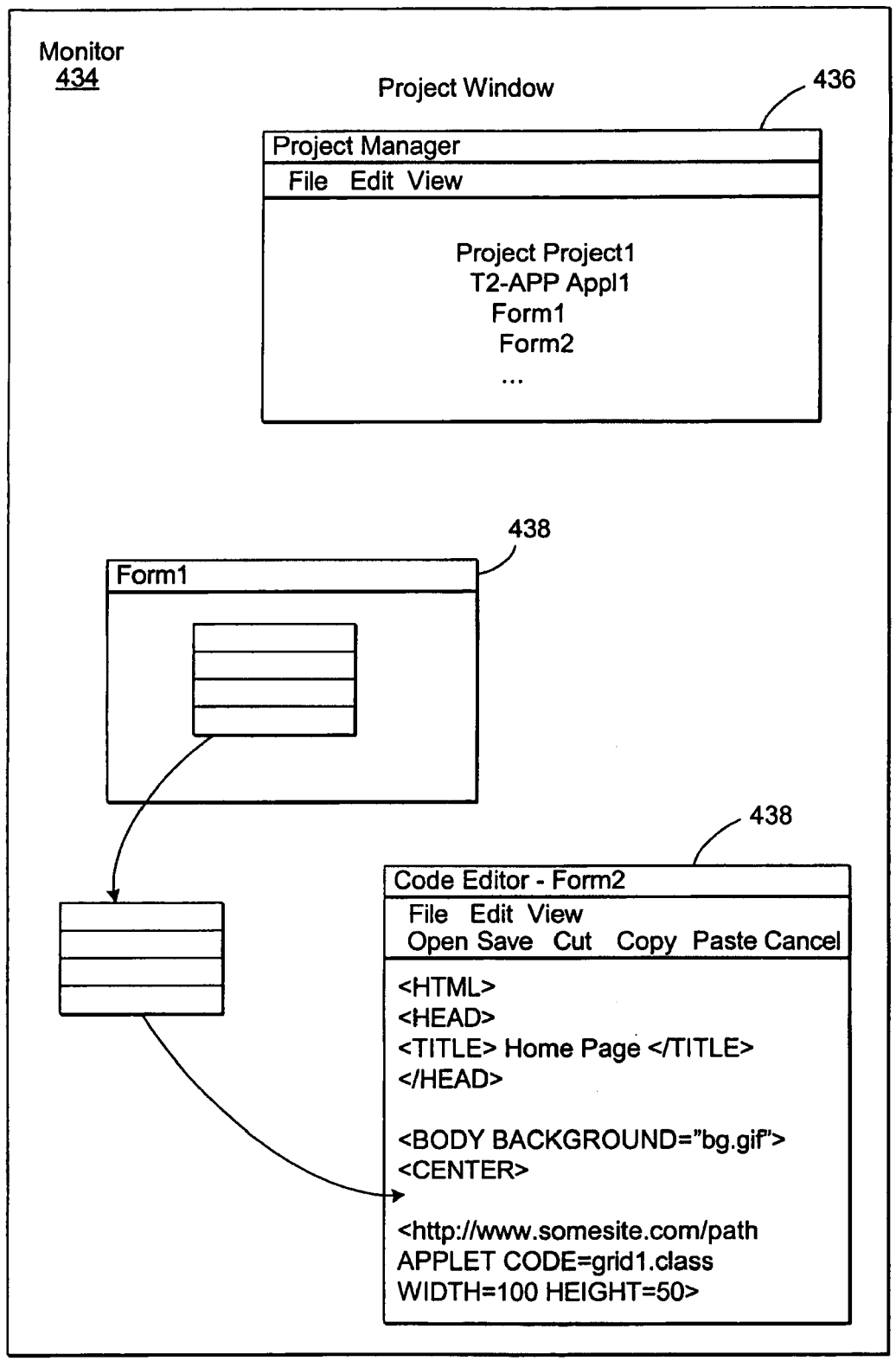

FIG. 8A is a flow chart that illustrates the general logic that implements the "drag object (object selected)" function of a "drag and drop" operation. FIGS. 8B, 8C, and 8D are block diagrams of a computer generated display illustrating the operation of the routine of FIG. 8A, wherein FIG. 8B illustrates the form editor and form window displaying FORM1 that includes a grid, FIG. 8C illustrates the grid being dragged from FORM1 to the code editor window displaying the HTML for FORM2 (by selecting the grid, holding down the right mouse button, and dragging the mouse cursor as indicated by the arrows), and FIG. 8D illustrates the present invention inserting an HTML reference to the object (e.g., "<http://www.somesite.com/path/APPLET CODE=grid1.class WIDTH=100 HEIGHT=50>") into FORM2 within the code editor window (by positioning the mouse cursor in the desired location of FORM2 and releasing the right mouse button).

In the preferred embodiment, the logic is executed whenever a "drag object (object selected)" event occurs in the development computer 400. The event may occur in response to various user inputs, e.g., by various mouse/keyboard combinations to invoke the function.

Block 800 represents the development computer 400 creating and moving a representation of the selected object from FORM1 along the mouse pointer path, as indicated in FIG. 8C. The representation may be a copy of the object itself or another graphical representation, such as a thumbnail or icon.

Block 802 represents the development computer 400 identifying the "drop" location for the drag and drop operation. This location is identified by the position of the mouse pointer when the right mouse button is released. In FIGS. 8B and 8C, this is indicated by position of the arrow within FORM2.

Block 804 represents the development computer 400 copying the selected object or a reference to the selected object to the drop location, as indicated in FIG. 8D. In this example, the present invention inserts an HTML reference to the object (e.g., "<http://www.somesite.com/path/APPLET CODE=grid1.class WIDTH=100 HEIGHT=50>") into FORM2 within the code editor window.

Finally, Block 806 represents the termination of the logic.

Applet List

Figures 9A, 9B:
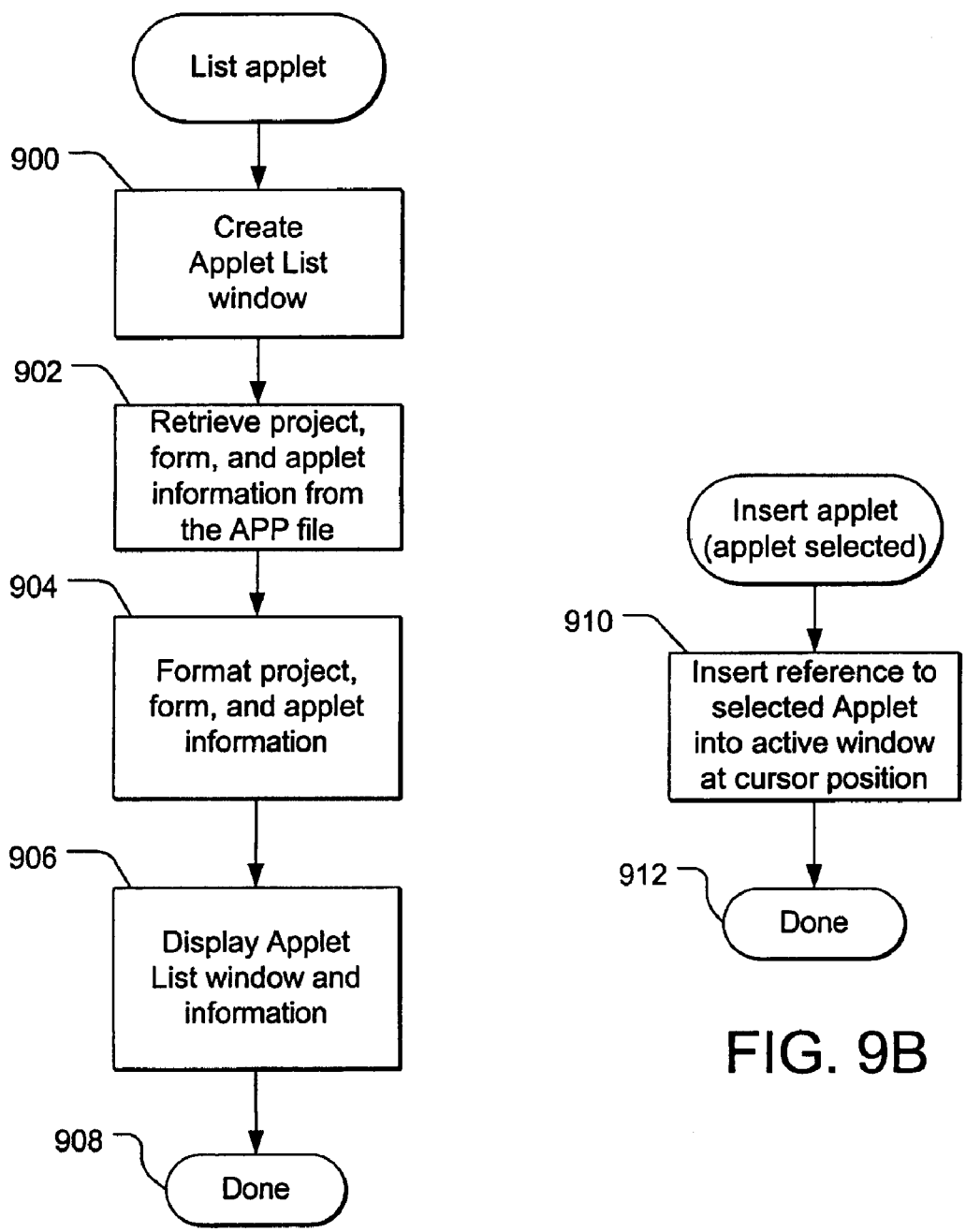
FIGS. 9A and 9B are flowcharts illustrating a "list applet" and "insert applet" function.
Figure 9C:
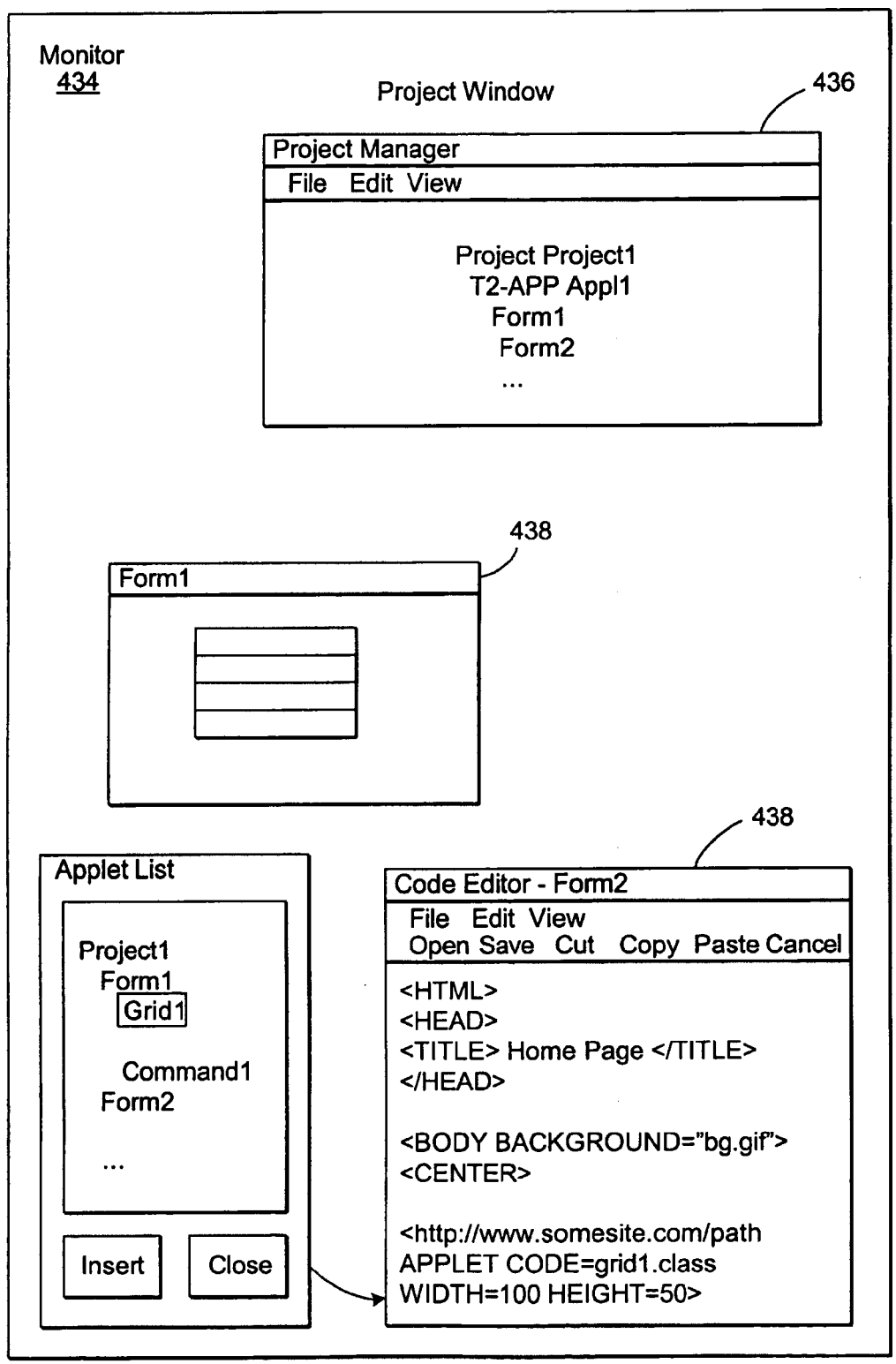

FIGS. 9A and 9B are flow charts that illustrate the general logic that implements the "list applet" and "insert applet (applet selected)" functions that provide an end result similar to the "drag and drop" operation described in conjunction with FIGS. 8A–8D. FIG. 9C is a block diagram of a computer generated display illustrating the operation of the routines of FIGS. 9A and 9B, wherein FIG. 9C illustrates the Applet List window displaying applets for all forms and projects known to the development computer, selecting "grid1" from the Applet List window, and then inserting an HTML reference to the applet (e.g., "<http://www.somesite.com/path/APPLET CODE=grid1.class WIDTH=100 HEIGHT=50>") into FORM2 within the code editor window (by positioning the cursor in the desired location of FORM2 and pressing the "Insert" button of the Applet List window).

In the preferred embodiment, the logic of FIG. 9A is executed whenever a "list applet" event occurs in the development computer and the logic of FIG. 9B is executed whenever an "insert applet (applet selected)" event occurs in the development computer 400. These events may occur in response to various user inputs, e.g., by various mouse/keyboard combinations to invoke the function.

Referring initially to FIG. 9A, Block 900 represents the development computer 400 creating an applet list window. The applet list window includes typical user interface mechanisms such as a title bar, a border, scroll bars, a minimize button, a maximize button, and a close button. A contents area is defined within the applet list window.

Block 902 represents the development computer 400 retrieving the project, form, and applet information (if any) from APP files stored in a data storage device connected (either locally or remotely) to the development computer 400.

Block 904 represents the development computer 400 formatting the retrieved project, form, and applet information (if any) for display within the contents area of the applet list window; otherwise, the contents area is blank.

Block 906 represents the development computer 400 displaying the form window and the formatted form information (if any) on a monitor, as shown in FIG. 9C. Opening or creation of the applet list window is then complete.

Finally, Block 908 represents the termination of the logic.

Referring next to FIG. 9B, Block 910 represents the development computer 400 inserting a reference to the selected applet into the active window at the current cursor position, as indicated in FIG. 9C. In this example, the present invention inserts an HTML reference to the applet (e.g., "<http://www.somesite.com/path/APPLET CODE=grid1.class WIDTH=100 HEIGHT=50>") into FORM2 within the code editor window.

Finally, Block 912 represents the termination of the logic.

Copy/Cut and Paste

Figure 10C:
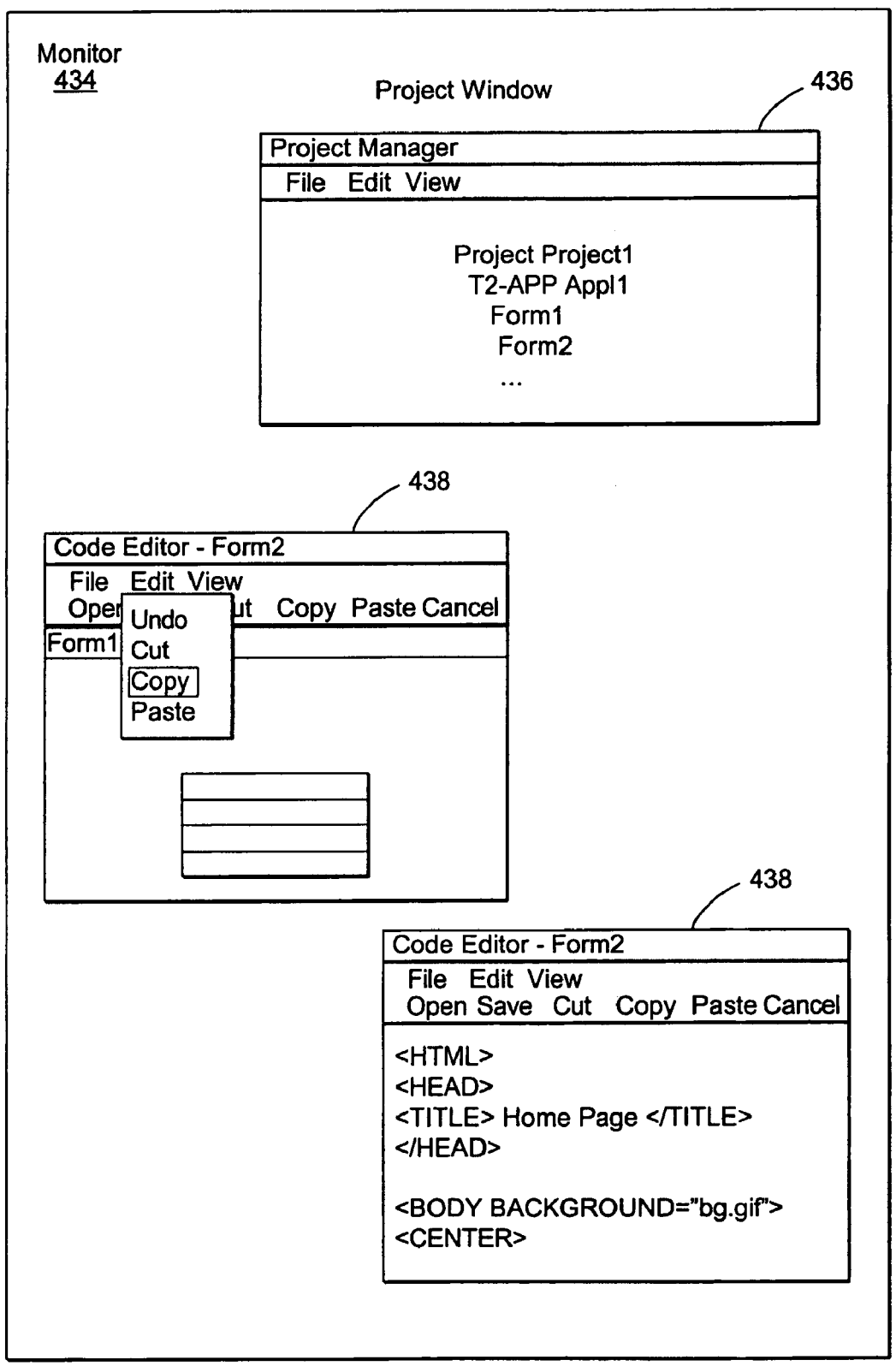
FIGS. 10A and 10B are flowcharts illustrating copy and paste functions.
Figure 10D:
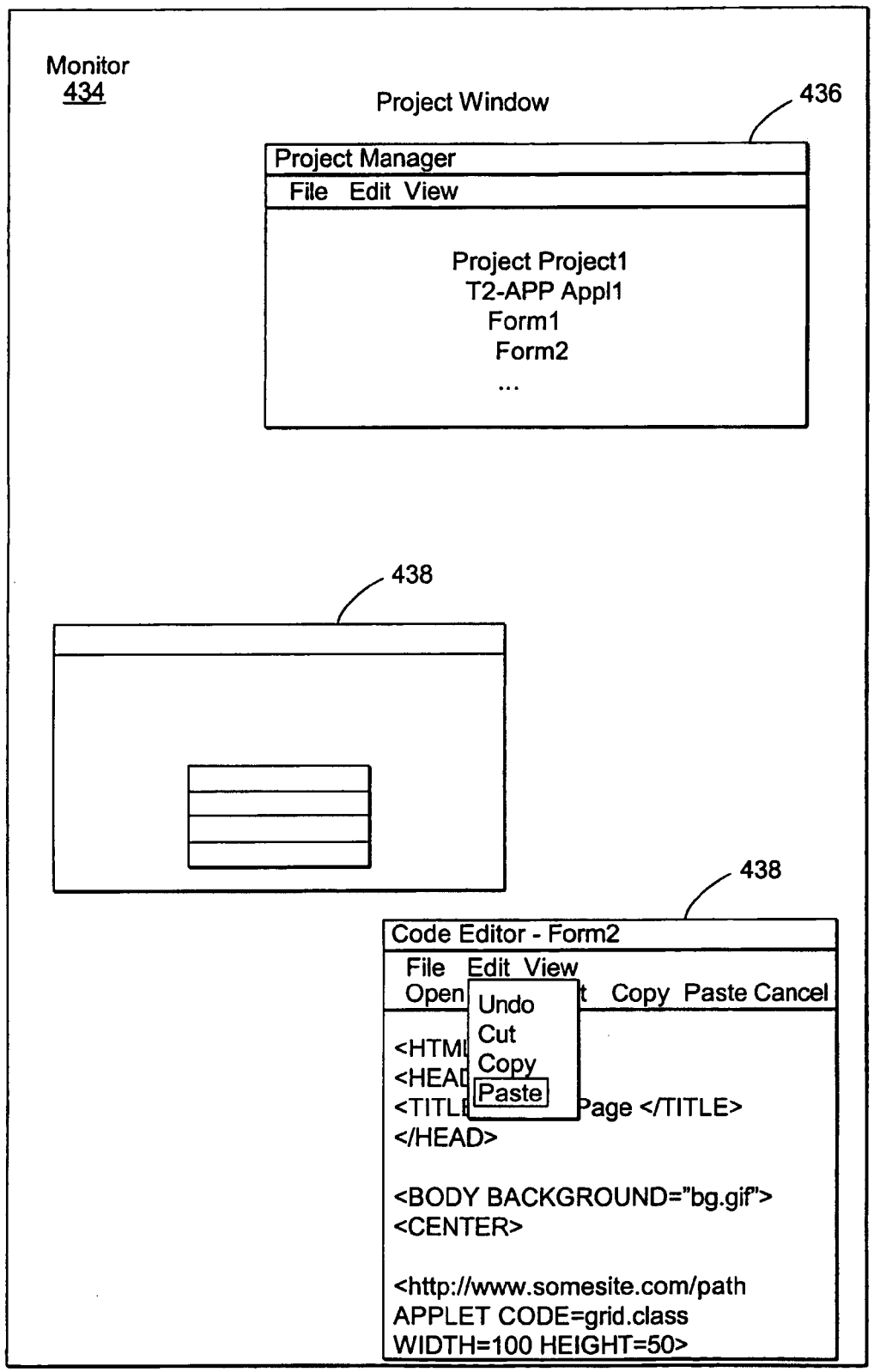

FIGS. 10A and 10B are flow charts that illustrate the general logic that implements the "copy/cut (object selected)" and "paste" functions that provide an end result similar to the "drag and drop" operation described in conjunction with FIGS. 8A–8D and the "applet list" operation described in conjunction with FIGS. 9A–9C. FIGS. 10C and 10D are block diagrams of a computer generated display illustrating the operation of the routines of FIGS. 10A and 10B, wherein FIG. 10C illustrates the "Edit" menu being used to copy a selected object from FORM1 to a clipboard and FIG. 10D illustrates the "Edit" menu being used to paste the copied object from the clipboard to FORM2.

In the preferred embodiment, the logic of FIG. 10A is executed whenever a "copy/cut (object selected)" event occurs in the development computer 400 and the logic of FIG. 10B is executed whenever a "paste" event occurs in the development computer 400. These events may occur in response to various user inputs, e.g., by various mouse/keyboard combinations to invoke the function.

Referring initially to FIG. 10A, Block 1000 represents the development computer 400 copying the selected object or a reference to the selected object into its memory.

Block 1002 represents the development computer 400 accessing the clipboard memory used with the "edit" functions.

Block 1004 represents the development computer 400 replacing the contents of the clipboard memory (if any) with the copied object or the copied reference to the object.

If the operation was a "cut" operation, then Block 1006 represents the development computer 400 cutting or removing the selected object or the reference to the object from FORM1.

Finally, Block 1008 represents the termination of the logic.

Referring next to FIG. 10B, Block 1010 represents the development computer 400 accessing the copied object or the copied reference to the object from the clipboard memory.

Block 1012 represents the development computer 400 pasting or inserting the copied object or the copied reference to the object into the active window at the current cursor position, as indicated in FIG. 10D. In this example, the present invention inserts an HTML reference to the object (e.g., "<http://www.somesite.com/path/APPLET CODE=grid1.class WIDTH=100 HEIGHT=50>") into FORM2 within the code editor window.

Finally, Block 1014 represents the termination of the logic.

HTML Page Switching

Figure 11A:
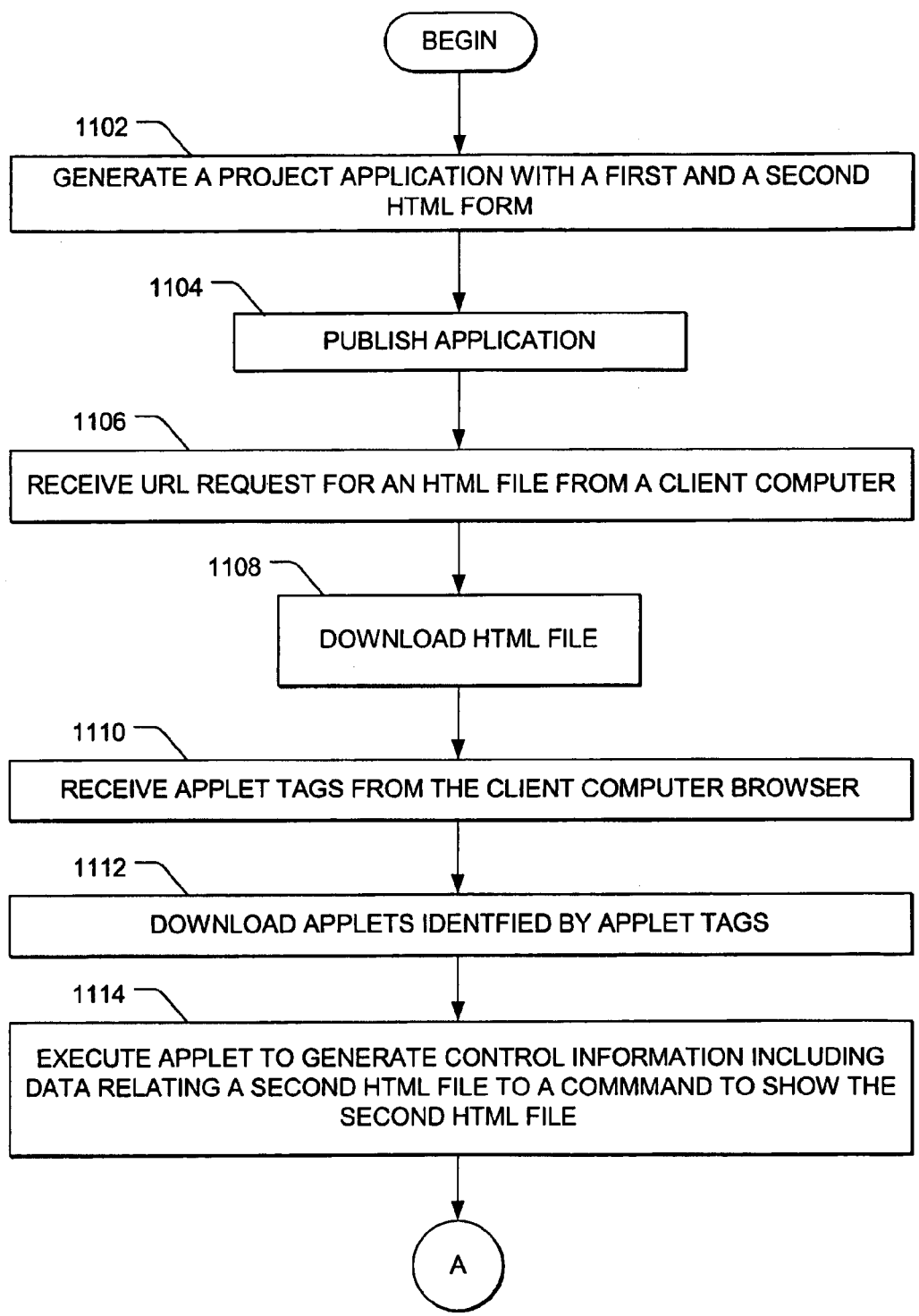
FIGS. 11A and 11B are flowcharts illustrating the operations performed in the programmatic switching of the present invention.
Figure 11B:
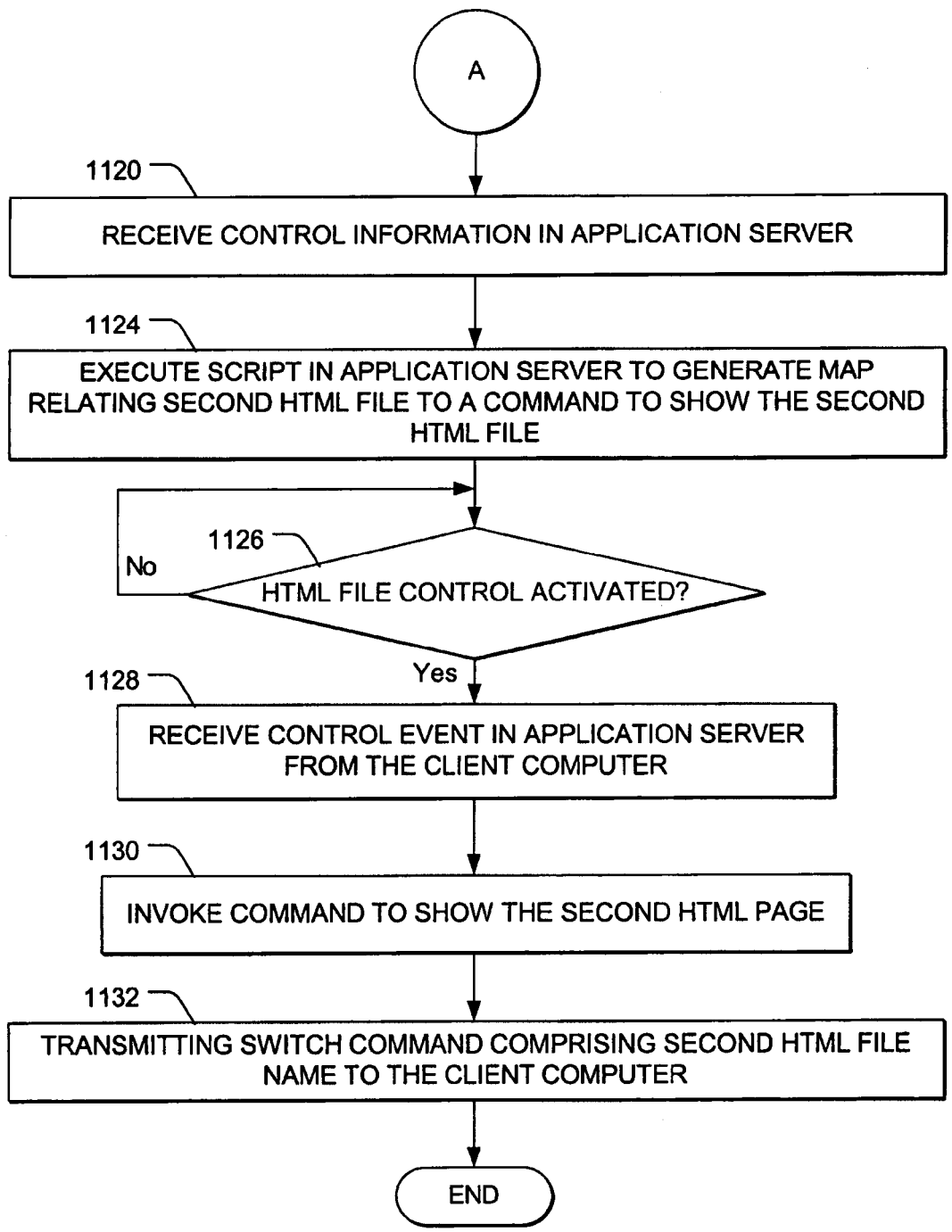

FIGS. 11A and 11B are diagrams showing the operations used to perform HTML page switching. The operations described in FIGS. 11A and 11B will be further described with respect to FIGS. 12–19. The process begins with the creation of a VAB-II project, as shown in block 1102.

Figure 12:
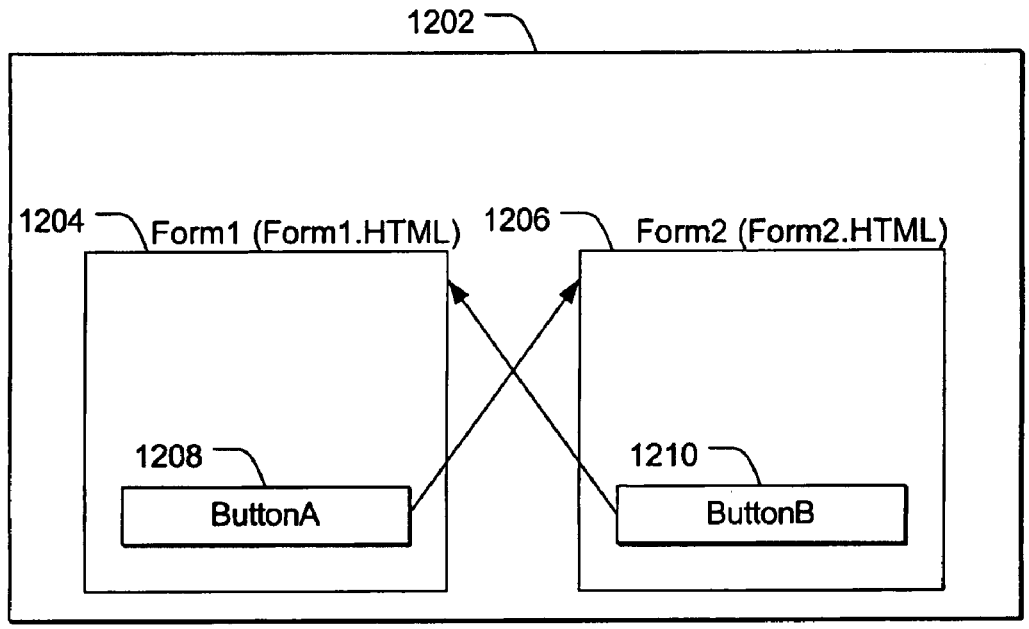
FIG. 12 is a diagram showing the creation of a project with two forms.

FIG. 12 is a diagram showing a representation of the created VAB-II project 1202. The project comprises an application 1202, hereinafter referred to as application1, with a first HTML page or form 1204, hereinafter referred to as Form1, which is associated with and implemented by the HTML and applet tags in Form1.HTML, and a second HTML page or form 1206, hereinafter referred to as Form2, which is implemented by the logic in Form2.HTML. Form1 1204 comprises a first button control 1208, hereinafter referred to as ButtonA, and Form2 1206 comprises a second button control 1210, hereinafter referred to as ButtonB. In one embodiment, ButtonA 1208 and ButtonB 1210 are JAVA applet controls.

Application 1202 is published to a server, as shown in block 1104 of FIG. 11A. This results in two HTML files and one APP file 454, as described herein. Other controls and static text can also be implemented on Form1 1204 and Form2 1206.

Figure 13:
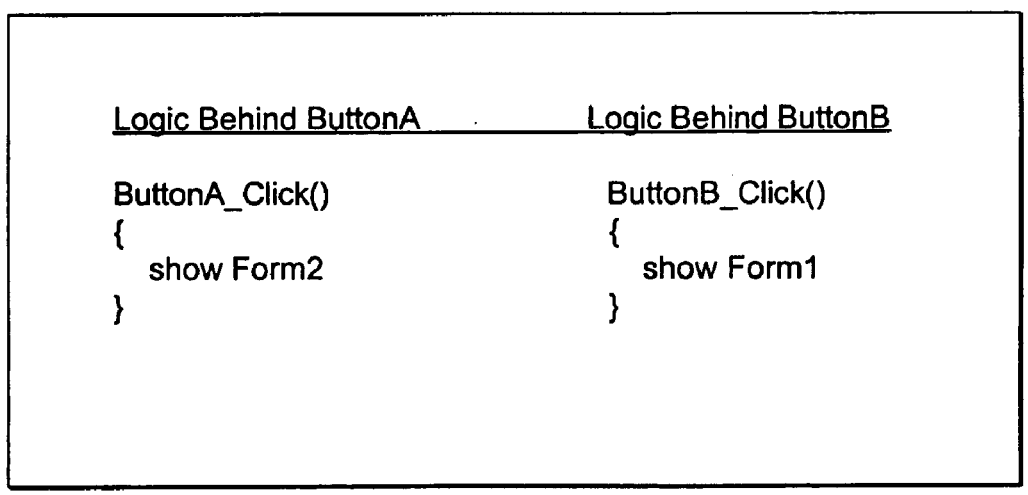
FIG. 13 is a diagram showing the logic behind the button controls illustrated in FIG. 12.

FIG. 13 depicts the programming logic behind ButtonA 1208 and Button B 1210 for application 1202. When a user sees Form1 1204 in a browser and clicks ButtonA 1208, the view switches to Form2 1206. That is, Form2 1206 is loaded into the browser instead of Form1. The reverse happens when Form2 1206 is displayed in the browser and the user clicks ButtonB 1210.

In the illustrated embodiment, the logic is written in the BASIC programming language, but other languages could be used as well. The programmer debugs this logic, publishes it to the network as depicted in block 1104 of FIG. 11A. Further details regarding this process are disclosed in co-pending and commonly owned patent application Ser. No. 08/828,897, entitled "MULTI-TIER DEBUGGING,". When application1 1202 is published to the network server 110, internet users (or the programmer, for that matter) can interact with it as described in co-pending and commonly owned application Ser. No. 09/102,323, entitled "REMOTE DEBUGGING OF INTERNET APPLICATIONS,".

Figure 14:
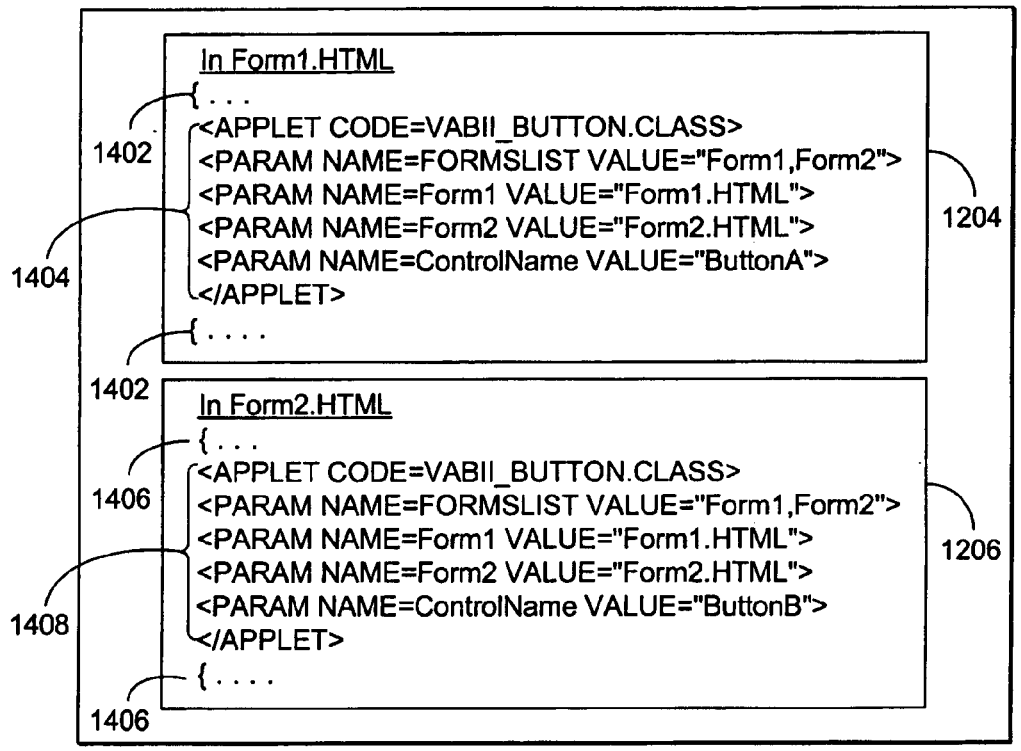
FIG. 14 is a diagram showing applet HTML tags for the applet button controls.

FIG. 14 shows the HTML for Form1 1204 and Form2 1206 after publication. Note that information necessary to switch HTML pages is embedded in each HTML page, Form1.HTML 1204 and Form2.HTML 1206. In addition to other generated HTML 1402 and 1406 unnecessary for illustrative purposes, Form1 1204 includes a first set of applet HTML tags 1404, and Form2 includes a second set of applet HTML tags 1408. The information in the first and second set of applet parameter tags 1404 and 1408 is transmitted to the application server 122. This is accomplished as described below with respect to FIG. 11A.

First, a request a URL request for an HTML file is received in the application server 122 via the network server 110 from a client computer 102. This is depicted in block 1106. In response, an HTML file (such as Form1.HTML 1204) is downloaded from the application server 122 to the client computer 102 via the network server 100. The applet parameter tags 1404 and 1408 are received from the client computer 102, which initiates the downloading of the applets identified by the applet tags into the client computer 102. These steps are illustrated in blocks 1110 and 1112. After they are downloaded into the client computer 102, they are initialized and executed by the browser 108. This is depicted in block 1114 of FIG. 11A. This execution generates information for the control (ButtonA 1208 or ButtonB 1210 in this example) and transmits that information to the application server 122. To effect the form switching capability, extra control information is included so that the VAB-II JAVA applet controls provide the application server 122 with information necessary to relate the name used for the form in the application (e.g. Form1) and its HTML representation (e.g. Form1.HTML). This allows the use of arbitrary authoring tools and allows generated HTML to be independent from the logic in the APP files 454.

The control information is then received in the application server 126, as depicted in block 1120 of FIG. 1B. Then, as depicted in block 1124, an application script 118 is executed in the application server 126. This application script 118 generates a map relating the command to show the HTML file to the command to show the HTML file, in this case, relating "Form2" with Form2.HTML.

Figure 15:
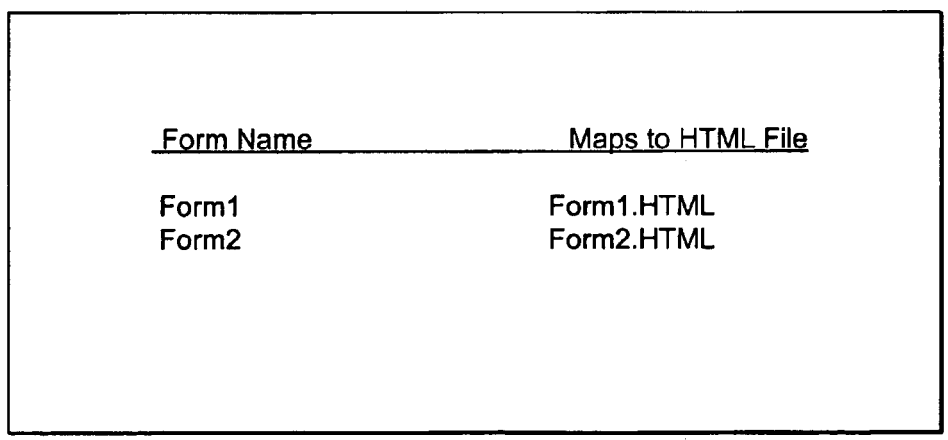
FIG. 15 is a diagram of a mapping from form names to corresponding HTML files.

FIG. 15 is a diagram showing a mapping relationship between the form name (e.g. Form1 and Form2) with the related HTML file (Form1.HTML 704 and Form2.HTML 706, respectively). The VAB-II runtime 128 in the application server 126 was given this mapping by from the information coded in the <PARAM> tags.

Returning to FIG. 11B, when the user activates an HTML file control by selecting ButtonA 1208 for example, the application server 122 receives a control event from the client computer, and invokes the command to show the HTML page by running the "ButtonA Click( )" code shown in FIG. 13. This logic is depicted in blocks 1126 and 1128. Because the application server 122 generated an arbitrarily definable mapping between Form2 and Form2.HTML, the "show Form2" command informs the application server 122 that it must return information to the ButtonA applet that will allow switch to Form2 in the browser 108. This is accomplished by invoking a command to show the second HTML page, as depicted in block 1130. In one embodiment, this is accomplished via a browser 108 switch command with the second HTML file name, as shown in blocks 1130 and 1132.

A programmer can also use an enterprise logic authoring tool like VAB-II to implement the foregoing automated page switching logic along a graphical authoring tool like NETOBJECT's FUSION. These commercially available authoring tools enable the user to create attractive, detailed web pages, and help keep the HTML pages and web sites more manageable.

Figure 16:
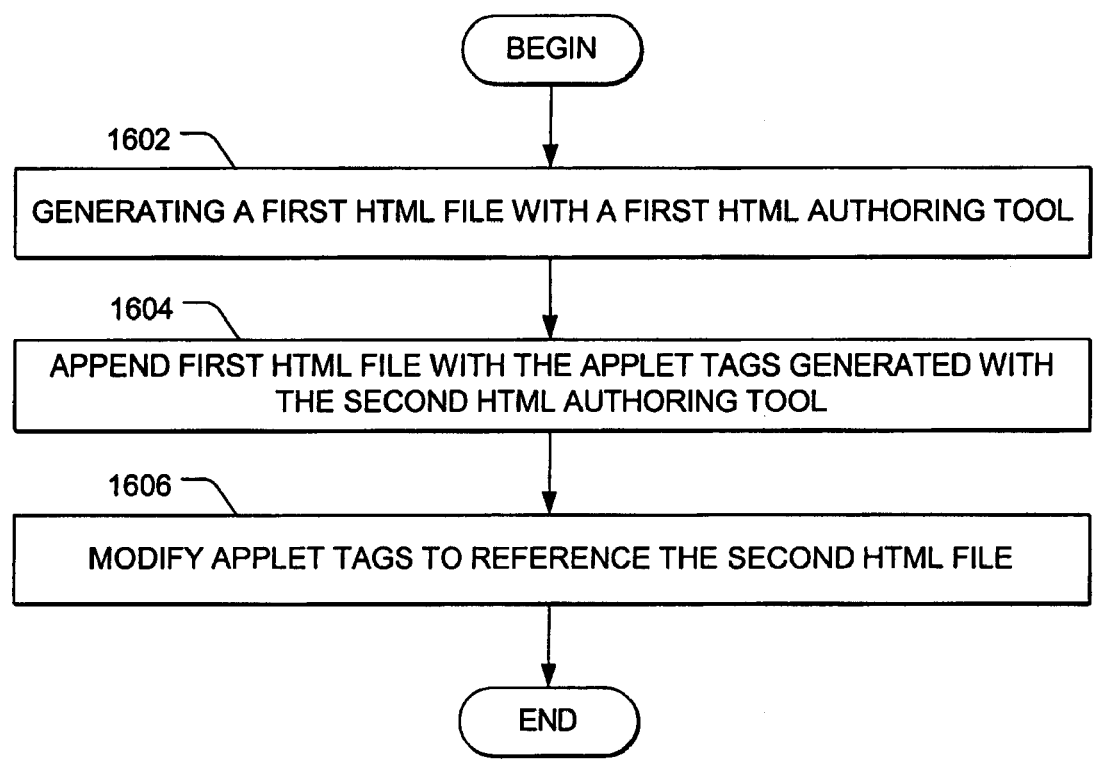
FIG. 16 is a flow chart illustrating the operations employed in using the present invention with an arbitrary HTML authoring tool.

FIG. 16 is a flow chart showing the use of the present invention with an arbitrary HTML authoring tool. First, the programmer uses the authoring tool to create two or more web pages. This is depicted in block 1602.

FIG. 17 is a diagram presenting a depiction of the HTML files generated by an arbitrary HTML authoring tool like FUSION. The files include an HTML file denoted Fusion1.HTML 1702 for Form1 and an HTML file denoted Fusion2.HTML 1704 for Form2.

As shown in block 1604 of FIG. 16, the programmer then copies the first set of applet HTML tags 1404 created for ButtonA 1208 from the Form1.HTML 1204 generated with the VAB-II logic authoring toot to the Fusion1.HTML file 1702, and the second set of applet HTML tags 1406 created for ButtonB 1210 from the Form2.HTML 1206 to the Fusion2.HTML file 1704. Then, the programmer modifies the applet parameter tags 1404 and 1408 to reflect the new HTML file names to refer to the FUSION-generated HTML pages. This is depicted in block 1606. Thereafter, the process is analogous to that which is depicted in blocks 1104–1132 if FIGS. 11A and 11B.

FIG. 18 is a diagram showing the FUSION HTML resulting from the above operations. The Fusion1.HTML file includes other generated HTML 1802 and 1806, and first set of FUSION applet HTML tags 1804, while the Fusion2.HTML file includes other generated HTML 1808 and 1812 as well as a second set of FUSION applet HTML tags 1810. The information in the first and second set of FUSION applet HTML tags 1304 and 1810 contain information which is transmitted to the application server 122 and used to generate the mapping from relating HTML files and commands to show the related HTML pages.

FIG. 19 is a diagram showing the new mapping of form names to HTML pages. This mapping is obtained from the foregoing procedures, and is analogous to the original mapping depicted in FIG. 18.

Although the foregoing illustrates switching between two arbitrary HTML pages, the present invention can be applied to support switching between any number of HTML pages. In such embodiments, the mapped relationships described in FIG. 10 for example, may include any number of mapping entries as required.

HTML Mapping/Substitution GUI

The foregoing can also be practiced with an automated control or HTML view tool. This tool understands that the controls on the forms are represented by applet tags and can cut and paste them visually, instead of by use of a text editor. The tool can also understand file names and automatically adjust the name that the programmer hand-edited in the foregoing description (such as changing Form1.HTML and Form2.HTML in the corresponding HTML files).

Figure 20:
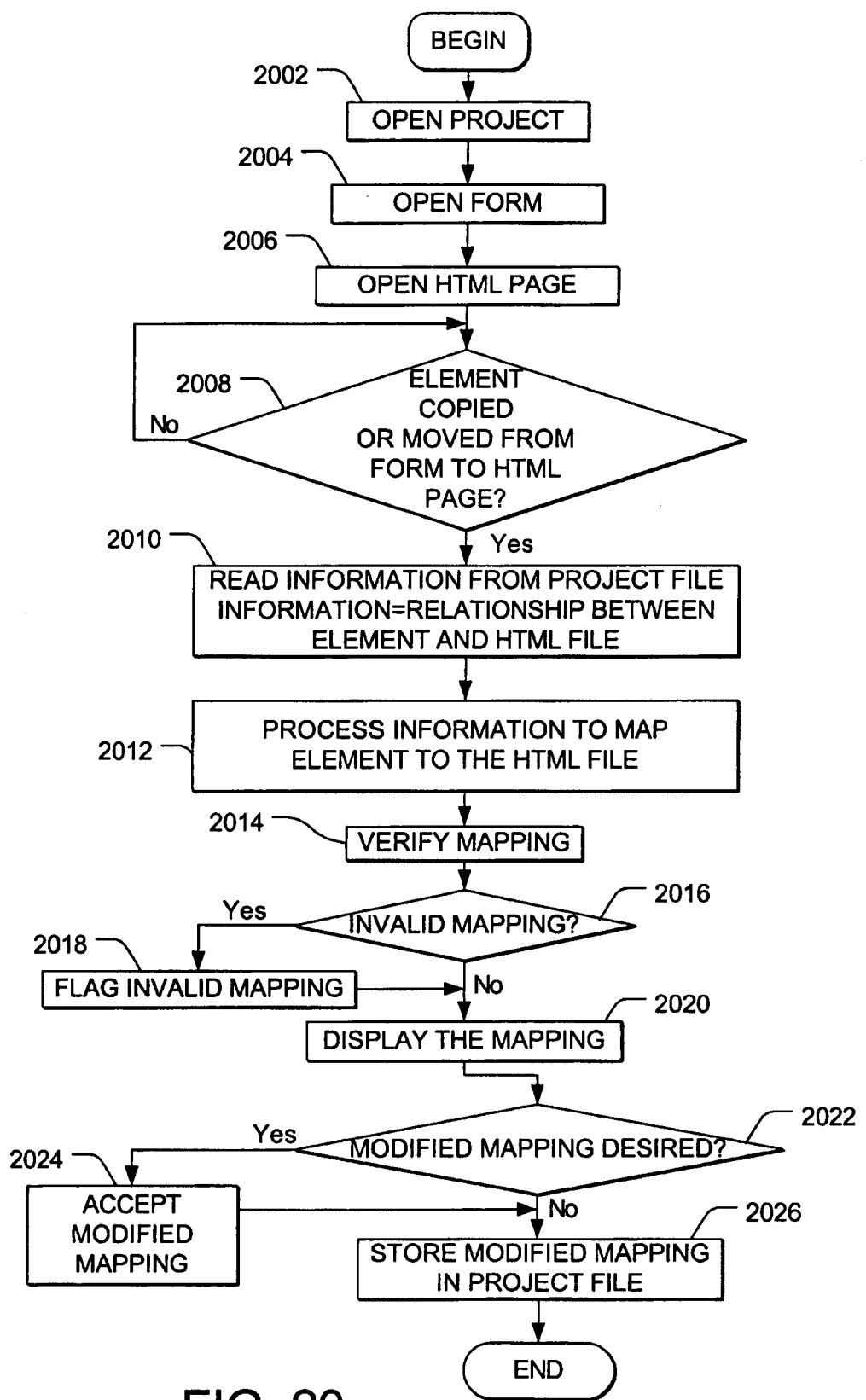
FIG. 20 is a flow chart illustrating the steps performed in displaying a relationship between a control on a form and an associated HTML file.

FIG. 20 is a flow chart illustrating the steps performed in displaying a relationship between a control on a form and an associated HTML file. The process begins by opening a project in the development environment, as described earlier in this disclosure. This is depicted in block 2002. When the project is opened, the monitor 434 displays a number of user interfaces including a form editor window 438, control pad 440, and browser 452. Next, the user opens a form within the project and an HTML page to which the elements on the form will be copied or moved. This is depicted in blocks 2004 and 2006, and is described in greater detail with respect to FIGS. 8A–10D earlier in this disclosure. When elements such as controls, buttons, data entry boxes, or picklists are moved, copied, or otherwise transferred from the form or the control pad 440 to the HTML form in the development environment, the other data section 652 of the project or APP file 454 is modified to store information mapping the element to the HTML page it was transferred to. This information includes the form name (if applicable), the element name, and the HTML file associated with the HTML page, and can include other information describing the legacy and heritage of the controls, forms, and elements.

When the HTML integration utility is opened, the HTML mapping/substitution view 411 is opened. At that time, the utility reads the information from the APP file 454. This is depicted in block 2010. The HTML mapping/substitution view 411 can be also opened without opening the HTML integration utility, by issuing a suitable command. A module reads the APP file 454 to obtain information describing the relationships between the element and the HTML file from the APP file 454. This information includes the element name, and the HTML file it was mapped to.

Next, the mapping is verified to assure that the relationships between the elements and the HTML files are correct. This is depicted in block 2016. If there are invalid or incomplete mappings, they are flagged 2018. Finally, the mapping is displayed on the monitor 434 as depicted in block 2020.

As described herein, it is sometimes useful for the software developer to manually change the HTML. For example, when implementing the programmatic switching of arbitrary HTML forms described herein, the applet parameter tags are modified to reflect the new HTML file names referring to the FUSION-generated HTML pages. In cases where a modified mapping is desired, the present invention accepts the modified mapping, and stores the modified mapping in the APP file 454. This is depicted in blocks 2022–2026.

While it is useful to allow the user to modify the mapping between elements and the HTML page, any changes in the HTML file names render the mapping between these file names and the elements transferred to the HTML pages invalid. There are also instances where the mapping may be incomplete. This can occur when one or more elements on a form are related to one another in such a way that the use of one of the elements requires the use of the other. In such cases, the elements must generally be transferred to an HTML page together. For example, an element such as an input box may be provided to accept user inputs, and a button control provided which, when activated, accepts the data in the input box for further operations. If the input box were transferred to the HTML page without the control button, the input box would be useless. The mapping between the input box element and the HTML page in this case is incomplete, because all of the mapping necessary to implement the element in the HTML page is not present.

Figure 21:
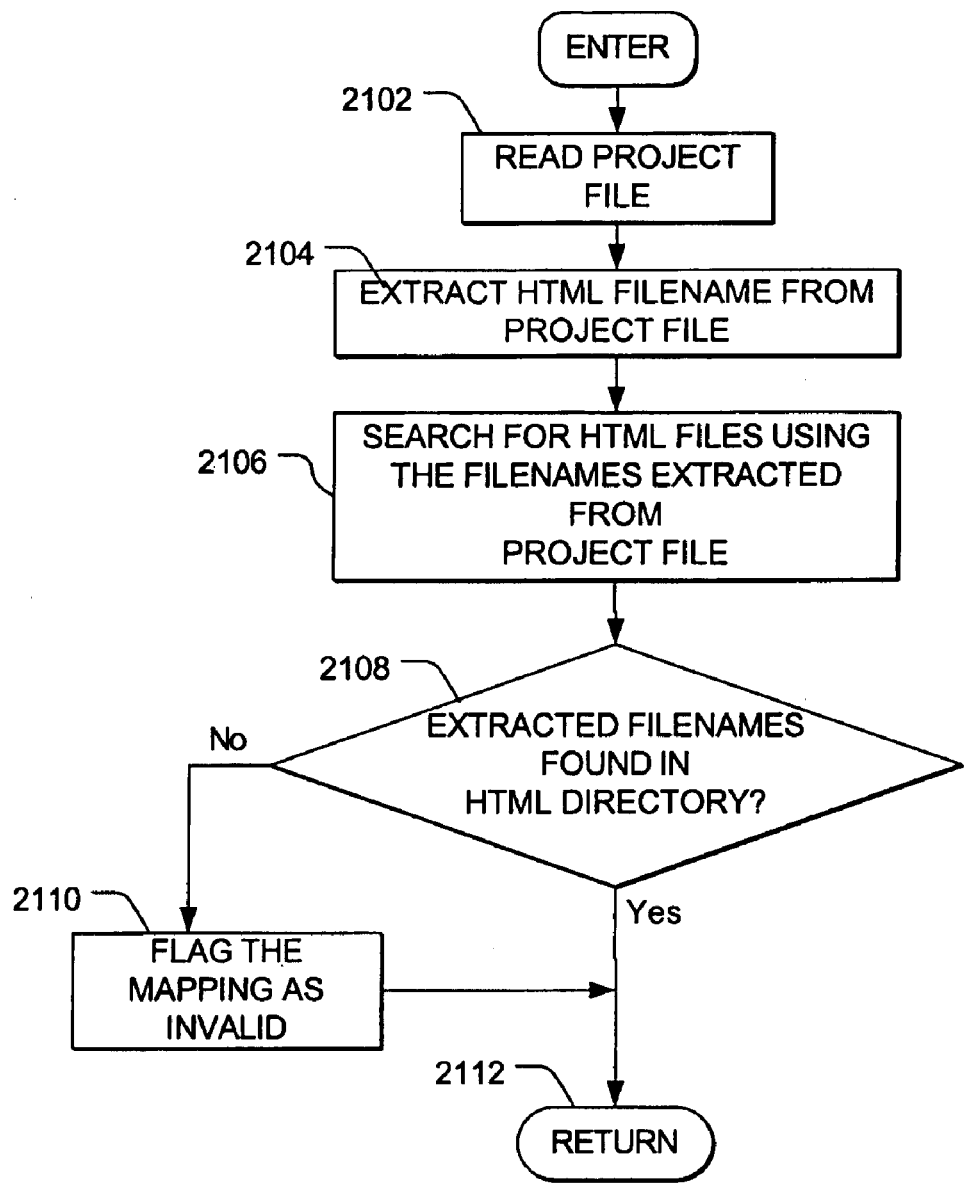
FIG. 21 is a flow chart illustrating the steps performed in verifying the mapping between form controls and associated HTML files.

FIG. 21 is a flow chart illustrating the steps performed in verifying the mapping between the form controls and associated HTML files. First, if the APP file 454 has not already been read, the logic reads the APP file 454. This is depicted in block 2102. Next, the HTML filenames are extracted from the project file, as shown in block 2104. The filenames include sufficient source information to determine the directory and location of the HTML files. Then, block 2106 performs a search for the HTML files using the extracted filenames. If the extracted filenames are not found in the directory, the mapping is flagged as invalid, as shown in block 2110. If the extracted filenames are found, the logic returns in block 2112.

Figure 22:
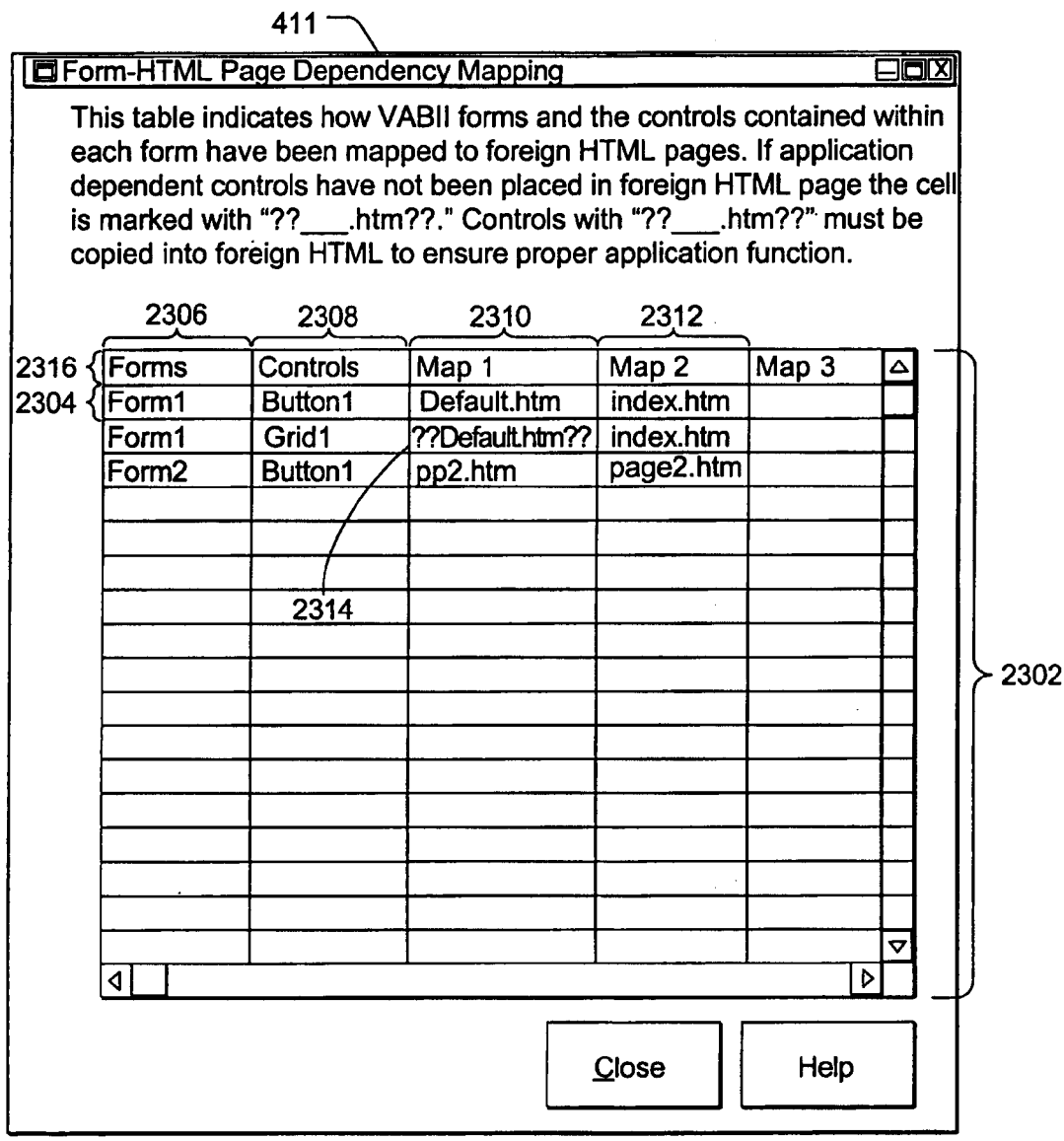
FIG. 22 is a diagram showing one embodiment of a graphical user interface for presenting relationships between form controls and associated HTML files.

FIG. 22 is a diagram showing one embodiment of a graphical user interface for presenting relationships between forms, controls, and HTML files. The graphical user interface includes an HTML mapping/substitution window 411, which comprises a table 2302 formed by a plurality of columns 2306–2312 and rows 2304. The first row 2316 is a header describing the contents of each column. The forms column 2306 displays the forms which are included in the open project. The controls column 2308 display the controls that are on the forms which are associated with the project. The mapping columns 2310 and 2312 show the HTML files to which the controls on the forms are mapped, either by using the HTML integration utility or by editing into the HTML files by hand. This mapping of HTML VAB-II forms into other HTML enables alternate browser views onto the same programming logic that runs on a server. By way of example, after a control such as Button1 is moved from Form1 to an HTML page (using the HTML integration utility or otherwise) represented by the file default.htm and to an HTML page represented by index.htm, a row 2304 is inserted into the table 2302 representing this mapping. Each time a new mapping is created by the HTML integration utility, a new column is added to the table 2302, and each new mapping column represents a view into the mapping of controls from forms to HTML pages within the project. The user can add these mapping columns 2310–2312 by hand. This can be accomplished by the selection of a menu item. If necessary, a dialog box can appear to guide the user through the process.

Each of the mapping columns 2310–2312 represents a number of HTML files in a particular directory. Since the HTML files are in a directory, system looks into that directory, reads the HTML files, and compares the required controls (from the APP file 454) with the mapped controls found in the HTML files. Assume for example that Form1 comprises a grid (such as "Grid1 in FIG. 22) for entering data, and a button (such as "Button1" in FIG. 22) which is depressed when all of the data is input into the grid. In this case, the button and the grid are dependent controls, and neither control should be mapped from a form to an HTML page without the other. A mapping of one of the controls to an HTML page without the other constitutes an invalid or incomplete mapping. This invalid or incomplete mapping is indicated by appending question mark delimiters on the HTML filename in the table 2302. This is illustrated in FIG. 22 in cell 2314. Using the HTML mapping/substitution window 411, the user can then modify the mapping by selecting the cell 2314 and modifying the text therein.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture, and memory for displaying a relationship between an HTML file and an element in the HTML file. The method comprises the steps of reading information from a project file, the information comprising a relationship between the element and the HTML file, processing the information to map the element to the HTML file, and displaying the mapping. In one embodiment, the invention also comprises a program storage device, tangibly embodying instructions for performing the above method steps.

The invention also comprises an apparatus for displaying a relationship between an HTML file and an element such as a control in the HTML file. The apparatus includes a means for reading information from a project file, a processor coupled to the reading means for using the information to map the element to the HTML file, and a display coupled to the processor for displaying the mapping.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method of displaying a relationship between an HTML file and an element from a form, wherein the element is in an HTML page, comprising:
   reading information from a project file, the information comprising a relationship between the element that has been transferred from the form to the HTML page and the HTML file associated with the HTML page;
   processing the information to map the element from the form to the HTML file; and
   displaying the mapping on a graphical user interface that indicates the relationship between the element, the form, and the HTML file.

2. The method of claim 1, wherein the information is generated when the element is transferred from the form to the HTML page associated with the HTML file.

3. The method of claim 1, wherein the element is selected from a group comprising:
   a visual control; and
   a non-visual control, selected from a group comprising a button, a picklist, and a data entry box.

4. The method of claim 1, wherein the information comprises an element name and an HTML file name.

5. The method of claim 4, wherein the information further comprises a form name.

6. The method of claim 1, wherein the displaying the mapping comprises presenting an element name and an HTML file name in a row of a table.

7. The method of claim 6, wherein the table comprises cells defined by the row and the column of the cell, and the mapping is entered into a cell of the table.

8. The method of claim 1, wherein the displaying the mapping comprises presenting the element name and the HTML file name in a column of a table.

9. The method of claim 1, further comprising flagging an invalid mapping between the element and the HTML file.

10. The method of claim 9, wherein the flagging an invalid mapping between the element and the HTML file comprises:
 reading the project file;
 extracting the HTML filename from the project file;
 searching for the HTML file using the extracted HTML filename; and
 flagging the mapping as invalid when the extracted HTML file is not found.

11. The method of claim 1, further comprising:
 accepting a modified mapping; and
 storing the modified mapping in the project file.

12. An apparatus for displaying a relationship between an HTML file and an element from a form, wherein the element is in an HTML page, comprising:
 means for reading information from a project file, the information comprising a relationship between the element that has been transferred from the form to the HTML page and the HTML file associated with the HTML page;
 means for processing the information to map the element from the form to the HTML file; and
 a display for presenting the mapping to a user on a graphical user interface that indicates the relationship between the element, the form, and the HTML file.

13. The apparatus of claim 12, wherein the information is generated when the element is transferred from the form to the HTML page associated with the HTML file.

14. The apparatus of claim 12, wherein the element is selected from a group comprising:
 a visual control;
 a non-visual control, selected from a group comprising a button, a picklist, and a data entry box.

15. The apparatus of claim 12, wherein the information comprises an element name and an HTML file name.

16. The apparatus of claim 15, wherein the information further comprises a form name.

17. The apparatus of claim 12, wherein the means for displaying the mapping comprises means for presenting the element name and the HTML file name in a row of a table.

18. The apparatus of claim 17, wherein the table comprises cells defined by the row and the column of the cell, and the mapping is entered into a cell of the table.

19. The apparatus of claim 12, wherein the means for displaying the mapping comprises means for presenting the element name and the HTML file name in a column of a table.

20. The apparatus of claim 12, further comprising means for flagging an invalid mapping between the element and the HTML file.

21. The apparatus of claim 20, wherein the means for flagging an invalid mapping between the element and the HTML file comprises:
 means for reading the project file;
 means for extracting the HTML filename from the project file;
 means for searching for the HTML file using the extracted HTML filename; and
 means for flagging the mapping as invalid when the extracted HTML file is not found.

22. The apparatus of claim 12, further comprising:
 means for accepting a modified mapping; and
 means for storing the modified mapping in the project file.

23. An article of manufacture, tangibly embodied on a computer readable medium, embodying logic to perform a method of displaying a relationship between an HTML file and an element that has been transferred from a form to an HTML page, the method comprising:
 reading information from a project file, the information comprising a relationship between the element that has been transferred from a form to an HTML page and the HTML file associated with the HTML page;
 processing the information to map the element from the form to the HTML file; and
 displaying the mapping on a graphical user interface that indicates the relationship between the element, the form, and the HTML file.

24. The article of manufacture of claim 23, wherein the information is generated when the element is transferred from the form to the HTML page associated with the HTML file.

25. The article of manufacture of claim 23, wherein the element is selected from a group consisting:
 a visual control; and
 a non-visual control, selected from a group comprising a button, a picklist, and a data entry box.

26. The article of manufacture of claim 23, wherein the information comprises an element name and an HTML file name.

27. The article of manufacture of claim 26, wherein the information further comprises a form name.

28. The article of manufacture of claim 23, wherein the displaying the mapping comprises presenting the element name and the HTML file name in a row of a table.

29. The article of manufacture of claim 28, wherein the table comprises cells defined by the row and the column of the cell, and the mapping is entered into a cell of the table.

30. The article of manufacture of claim 23, wherein the displaying the mapping comprises presenting the element name and the HTML file name in a column of a table.

31. The article of manufacture of claim 23, wherein the method further comprises flagging an invalid mapping between the element and the HTML file.

32. The article of manufacture of claim 31, wherein the flagging an invalid mapping between the element and the HTML file comprises:
 reading the project file;
 extracting the HTML filename from the project file;
 searching for the HTML file using the extracted HTML filename; and
 flagging the mapping as invalid when the extracted HTML file is not found.

33. The article of manufacture of claim 23, wherein the method further comprises:
 accepting a modified mapping; and
 storing the modified mapping in the project file.

34. A computer readable data structure, tangibly embodied on a computer readable medium, for representing a software project in a single file, the software project comprising a project application defined by executable programming logic, and a project environment for developing the application, the data structure comprising:

a first section comprising the executable programming logic needed to load and execute the project application for the computer;

a second section for storing data required to restore the project environment, and for storing information comprising a relationship between elements that have been transferred from a form to an HTML page and HTML files associated with the HTML page in the project;

wherein the relationship between elements, the form, and the HTML file is displayed in a graphical user interface.

* * * * *